US012718791B2

(12) United States Patent
Zhang et al.

(10) Patent No.: US 12,718,791 B2
(45) Date of Patent: Aug. 25, 2026

(54) METHOD AND DEVICE FOR GENERATING SPEECH, STORAGE MEDIUM, AND ELECTRONIC DEVICE

(71) Applicant: NETEASE (HANGZHOU) NETWORK CO., LTD., Hangzhou (CN)

(72) Inventors: Haitong Zhang, Hangzhou (CN); Yue Lin, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 124 days.

(21) Appl. No.: 18/858,328

(22) PCT Filed: Sep. 22, 2022

(86) PCT No.: PCT/CN2022/120602

§ 371 (c)(1),
(2) Date: Oct. 20, 2024

(87) PCT Pub. No.: WO2023/226260

PCT Pub. Date: Nov. 30, 2023

(65) Prior Publication Data

US 2025/0266032 A1 Aug. 21, 2025

(30) Foreign Application Priority Data

May 27, 2022 (CN) ........................ 202210593870.9

(51) Int. Cl.
*G10L 13/027* (2013.01)
*G10L 13/02* (2013.01)
(Continued)

(52) U.S. Cl.
CPC ............ *G10L 13/027* (2013.01); *G10L 13/06* (2013.01); *G10L 13/08* (2013.01); *G10L 17/02* (2013.01);
(Continued)

(58) Field of Classification Search
CPC ....... G10L 13/027; G10L 13/08; G10L 13/06; G10L 2019/0002; G10L 2019/0013; G10L 13/02; G10L 25/18
(Continued)

(56) References Cited

U.S. PATENT DOCUMENTS

2021/0020161 A1 1/2021 Gao
2024/0087558 A1 * 3/2024 Oplustil Gallegos ........................ G10L 13/033

FOREIGN PATENT DOCUMENTS

CN 111837178 A 10/2020
CN 111862934 A 10/2020
(Continued)

OTHER PUBLICATIONS

2nd Office Action dated Jul. 11, 2025 of Chinese Application No. 2022105938709.

(Continued)

*Primary Examiner* — George C Monikang
(74) *Attorney, Agent, or Firm* — Qinghong Xu

(57) ABSTRACT

A method for generating a speech includes acquiring a voice feature vector of a voice to be processed, and inputting the voice feature vector into a voice generation model to obtain a language unit vector; acquiring a text feature vector, and determining, according to the text feature vector and the language unit vector, a feature vector to be processed; and inputting the feature vector to be processed into a sequence-to-sequence model to obtain an acoustic feature vector, and inputting the acoustic feature vector into a vocoder to obtain
(Continued)

a target voice corresponding to the voice to be processed or the text feature vector.

20 Claims, 8 Drawing Sheets

(51) Int. Cl.

| | |
|---|---|
| ***G10L 13/06*** | (2013.01) |
| ***G10L 13/08*** | (2013.01) |
| ***G10L 17/02*** | (2013.01) |
| ***G10L 19/038*** | (2013.01) |
| ***G10L 25/18*** | (2013.01) |
| *G10L 19/00* | (2013.01) |

(52) U.S. Cl.
CPC ........... *G10L 19/038* (2013.01); *G10L 25/18* (2013.01); *G10L 2019/0002* (2013.01); *G10L 2019/0013* (2013.01)

(58) Field of Classification Search
USPC .................... 704/9, 200, 202, 231, 246, 251
See application file for complete search history.

(56) References Cited

FOREIGN PATENT DOCUMENTS

| | | | |
|---|---|---|---|
| CN | 112133282 | A | 12/2020 |
| CN | 112233646 | A | 1/2021 |
| CN | 112349273 | A | 2/2021 |
| CN | 113160793 | A | 7/2021 |
| CN | 113160794 | A | 7/2021 |
| CN | 113327575 | A | 8/2021 |
| CN | 113327580 | A | 8/2021 |
| CN | 113555000 | A | 10/2021 |
| CN | 114255735 | A | 3/2022 |
| CN | 114267329 | A | 4/2022 |
| CN | 114999443 | A | 9/2022 |
| JP | H05265496 | A | 10/1993 |
| JP | 2019109306 | A | 7/2019 |
| JP | 2020060633 | A | 4/2020 |
| WO | 2021183229 | A1 | 9/2021 |

OTHER PUBLICATIONS

Decision of Rejection dated Sep. 19, 2025 of Chinese Application No. 2022105938709.
1st Office Action dated Oct. 28, 2025 of Japanese Application No. 2024-568723.
1st Office Action dated Feb. 20, 2025 of Chinese Application No. 2022105938709.
International Search Report dated Feb. 17, 2023 of International Application No. PCT/CN2022/120602.
Haitong Zhang and Yue Lin, Improve Few-Shot Voice Cloning Using Multi-Modal Learning, 2022 IEEE International Conference on Acoustics, Speech and Signal Processing (ICASSP), published on Apr. 27, 2022.
Yuxuan Wang et al., Tacotron: Towards end-to-end speech synthesis, Proc. Interspeech 2017, published in 2017.
Jonathan Shen et al., Natural tts synthesis by conditioning wavenet on mel spectrogram predictions, 2018 IEEE International Conference on Acoustics, Speech and Signal Processing (ICASSP), published in 2018, p. 4779-4783.
Aaron van den Oord et al., Wavenet: A generative model for raw audio, 9th ISCA Speech Synthesis Workshop.
Aaron van den Oord et al., Parallel wavenet: Fast high-fidelity speech synthesis, International conference on machine learning, published in 2018.
Zhao Yi et al., Voice conversion challenge 2020 Intra-lingual semi-parallel and cross-lingual voice conversion, https://arxiv.org/abs/2008.12527, published in 2020.
Lifa Sun et al., Phonetic posteriorgrams for many-to-one voice conversion without parallel data training, 2016 IEEE International Conference on Multimedia and Expo (ICME), published in 2016, p. 1-6.
Kaizhi Qian et al., Autovc: Zero-shot voice style transfer with only autoencoder loss, International Conference on Machine Learning, published in 2019.
Haitong Zhang, The neteasegames system for voice conversion challenge 2020 with vector-quantization variational autoencoder and wavenet, Proc. Joint Workshop for the Blizzard Challenge and Voice Conversion Challenge 2020, published in 2020.
Takuhiro Kaneko and Hirokazu Kameoka, Cyclegan-vc: Non-parallel voice conversion using cycle-consistent adversarial networks, 2018 26th European Signal Processing Conference (EUSIPCO), published in 2018.
Hirokazu Kameoka et al., Stargan-vc: Non-parallel many-to-many voice conversion using star generative adversarial networks, 2018 IEEE Spoken Language Technology Workshop (SLT), published in 2018.
Sercan O. Ark et al., Neural voice cloning with a few samples, Proceedings of the 32nd International Conference on Neural Information Processing Systems, published in 2018.
Yutian Chen et al., Sample efficient adaptive text-to-speech, International Conference on Learning Representations, published in 2019.
Henry B. Moss et al., BOFFIN TTS Few-shot speaker adaptation by bayesian optimization, 2020 IEEE International Conference on Acoustics, Speech and Signal Processing (ICASSP), published in 2020.
Katsuki Inoue et al., Semi-supervised speaker adaptation for end-to-end speech synthesis with pretrained models, 2020 IEEE International Conference on Acoustics, Speech and Signal Processing (ICASSP), published in 2020, p. 7634-7638.
Ye Jia et al., Transfer learning from speaker verification to multispeaker text-to-speech synthesis, 32nd Conference on Neural Information Processing Systems, published in 2018.
Eliya Nachmani et al., Fitting new speakers based on a short untranscribed sample, International Conference on Machine Learning, published in 2018.
Seung-won Park et al., Cotatron: Transcription-guided speech encoder for any-to-many voice conversion without parallel data, Proc. Interspeech 2020, published in Oct. 2020, p. 4696-4700.
Wen-Chin Huang et al., Voice transformer network: Sequence-to-sequence voice conversion using transformer with text-to-speech pretraining, Proc. Interspeech 2020, published in 2020.
Tae-Ho Kim et al., Emotional voice conversion using multitask learning with text-to-speech, 2020 IEEE International Conference on Acoustics, Speech and Signal Processing (ICASSP), published in 2020.
Mingyang Zhang et al., Joint training framework for text-to-speech and voice conversion using multi-source tacotron and wavenet, Proc. Interspeech 2019, published in 2019.
Hieu-Thi Luong and Junichi Yamagishi, Nautilus: a versatile voice cloning system, IEEE/ACM Transactions on Audio, Speech, and Language Processing, vol. 28, published in 2020, p. 2967-2981.
Honglak Lee et al., Unsupervised feature learning for audio classification using convolutional deep belief networks, Advances in neural information processing systems, published in 2009.
James Glass, Towards unsupervised speech processing, the 11th International Conference on Information Science, Signal Processing and their Applications: Main Tracks, published in 2012, p. 1-4.
Wei-Ning Hsu et al., Unsupervised learning of disentangled and interpretable representations from sequential data, Advances in neural information processing systems, published in 2017.
Aaron van den Oord et al., Neural discrete representation learning, 31st Conference on Neural Information Processing Systems, published in 2017.
Yu-An Chung et al., An unsupervised autoregressive model for speech representation learning, Proc. Interspeech 2019, published in 2019.
Jan Chorowski et al., Unsupervised speech representation learning using WaveNet autoencoders, IEEE/ACM transactions on audio, speech, and language processing, vol. 27, No. 12, published in 2019.

(56) References Cited

OTHER PUBLICATIONS

Haitong Zhang and Yue Lin, Unsupervised learning for sequence-tosequence text-to-speech for low-resource languages, Proc. Interspeech 2020, published in 2020.
Wei Ping et al., Clarinet Parallel wave generation in end-to-end text-to-speech, International Conference on Learning Representations, published in 2018.
Veaux, Christophe et al., Superseded—CSTR VCTK corpus English multi-speaker corpus for CSTR voice cloning toolkit, http://datashare.is.ed.ac.uk/handle/10283/2651, published in 2017.
Diederik P. Kingma and Jimmy Lei Ba, Adam: A method for stochastic optimization, published in 2015.
Alex Graves, Generating sequences with recurrent neural networks, http://arxiv.org/abs/1308.0850, published in 2013.
Robert F. Kubichek, Mel-cepstral distance measure for objective speech quality assessment, Proceedings of IEEE Pacific Rim Conference on Communications Computers and Signal Processing, vol. 1, published in 1993, p. 125-128.

* cited by examiner

METHOD AND DEVICE FOR GENERATING SPEECH, STORAGE MEDIUM, AND ELECTRONIC DEVICE

CROSS-REFERENCE TO RELATED APPLICATION

The present disclosure claims the priority to the Chinese Patent Application NO. 202210593870.9, entitled "METHOD AND DEVICE FOR GENERATING SPEECH, STORAGE MEDIUM, AND ELECTRONIC DEVICE", filed on May 27, 2022, the entire contents of which are incorporated herein by reference for all purposes.

TECHNICAL FIELD

The present disclosure relates to the field of speech processing technologies, and in particular to a method for generating a speech, a device for generating a speech, a non-transitory computer-readable storage medium, and an electronic device.

BACKGROUND

In recent years, with the rapid development of deep learning, Text to Speech (TTS) technologies have made significant progress. In addition, thanks to the development of various deep learning technologies, Voice Conversion (VC) has also made rapid progress.

It should be noted that the information disclosed in the background section above is only used to enhance the understanding of the background of the present disclosure, and therefore may include information that does not constitute the prior art known to those skilled in the art.

SUMMARY

According to a first aspect of embodiments of the present disclosure, there is provided a method for generating a speech, and the method includes.

- acquiring a speech feature vector of a to-be-processed speech, and inputting the speech feature vector into a speech generation model to obtain a language unit vector;
- acquiring a text feature vector, and determining a to-be-processed feature vector according to the text feature vector and the language unit vector; and
- inputting the to-be-processed feature vector into a sequence-to-sequence model to obtain an acoustic feature vector, and inputting the acoustic feature vector into a vocoder to obtain a target speech corresponding to the to-be-processed speech or the text feature vector.

According to a second aspect of embodiments of the present disclosure, there is provided an electronic device, including: a processor and a memory, wherein computer-readable instructions are stored in the memory, and the computer-readable instructions, when executed by the processor, implement the method for generating the speech in any of the above embodiments.

According to a third aspect of an embodiment of the present disclosure, there is provided a non-transitory computer-readable storage medium having a computer program stored thereon, wherein the computer program, when executed by a processor, implements the method for generating the speech in any of the above embodiments.

It should be understood that the above general description and the following detailed description are merely exemplary and explanatory, and should not limit the present disclosure.

DETAILED DESCRIPTION

Figure 1:
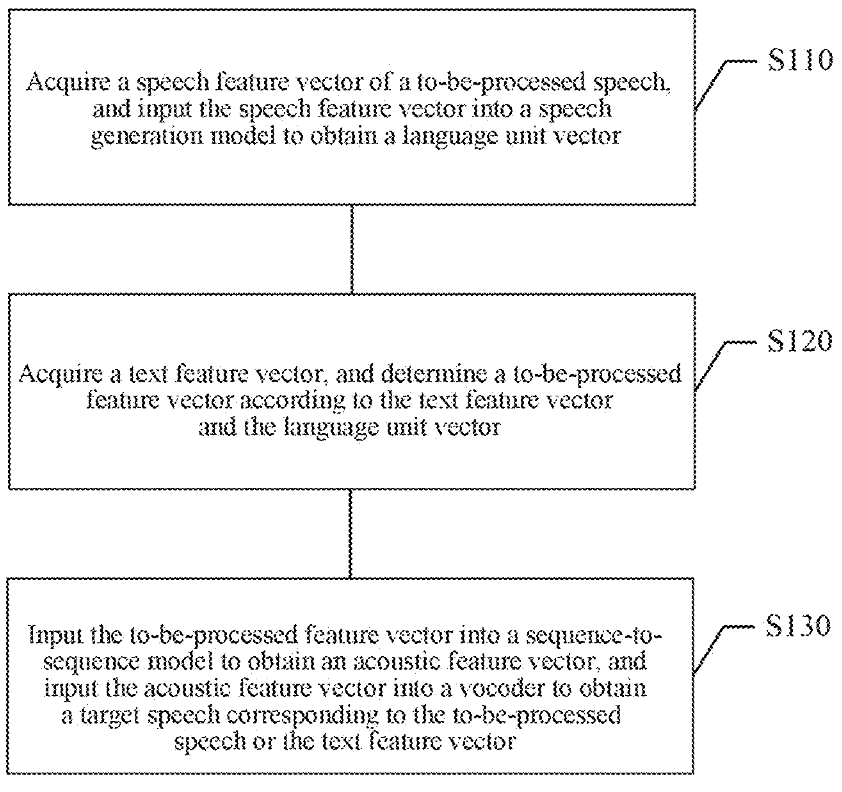
FIG. 1 schematically shows a flowchart of a method for generating a speech in an embodiment of the present disclosure.

Example embodiments will now be described more fully with reference to the accompanying drawings. However, the example embodiments may be implemented in a variety of forms and should not be construed as being limited to examples set forth herein; rather, these embodiments are provided so that the present disclosure will be more complete and comprehensive so as to convey the spirit of the example embodiments to those skilled in this art. The described features, structures, or characteristics may be combined in any suitable manner in one or more embodiments. In the description below, numerous specific details are set forth to provide a thorough understanding of embodiments of the present disclosure. However, those skilled in the art will appreciate that the technical solution of the present disclosure may be practiced without one or more of the specific details, or other methods, components, devices, steps and the like may be employed. In other instances, well-known technical solutions are not shown or described in detail to avoid obscuring various aspects of the present disclosure.

The terms "one", "a", "the", and "said" in the present specification are used to indicate that there are one or more elements/components or the like; the terms "include" and "have" are used to indicate an open meaning of including and means that there may be additional elements/components/etc. in addition to the listed elements/components/etc.; and the terms "first", "second" etc. are used only as markers, and do not limit the number of objects.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities.

In recent years, with the rapid development of deep learning, TTS technologies have made significant progress. In addition, thanks to the development of various deep learning technologies, VC has also made rapid progress. However, both TTS models and VC models require a large amount of recorded speech data (more than ten hours) to achieve the desired effect. Speech recording is very expensive and complicated.

Therefore, how to ensure the effect of TTS and VC when only a small amount of speaker data can be obtained has become a hot topic of research. This research is called speaker adaptation, or speaker cloning.

The speaker adaptation is a technology that quickly and automatically adapts a deep learning model to a target speaker, so that the performance of the deep learning model on this speaker is significantly improved.

From the perspective of the speaker cloning, the TTS technologies and the VC should be viewed as a system that generates a speech of the target speaker based on different inputs.

In the TTS field, the speaker adaptation can be divided into supervised speaker adaptation and unsupervised speaker adaptation.

The supervised speaker adaptation means that <text, speech> paired data is required during adaptation, while the unsupervised speaker adaptation means that only speech data is required during the adaptation without the corresponding text.

Previous researches have shown that in the supervised speaker adaptation, a small amount of <text, speech> paired data of the target speaker is used to fine-tune a multi-speaker base model, thereby achieving a high-quality effect.

However, in the unsupervised speaker adaptation, fine-tuning the model is not possible.

A common unsupervised speaker adaptation method uses a speaker recognition model to extract a speaker vector from a speech, and then uses this speaker vector to synthesize the speech of the speaker.

However, as the amount of data increases, the performance of this method will not be improved any further.

At present, some researches have combined the TTS technologies and the VC.

For example, a sequence-to-sequence TTS model is used to extract a speaker-independent representation to model a VC model; a TTS pre-trained model is used to improve the effect of the VC model; different encoders are used to encode different input source content, and then the same decoder is used for decoding, two tasks can be handled at the same time. However, the effect of TTS will always decline from the effect point of view.

Alternatively, different encoders are used to encode different input source content, but the training of the model is more complicated and requires more loss functions and hyperparameters. Therefore, the research combining the TTS technologies and the VC not only has a complex training method, but also cannot handle the TTS and the VC well enough to improve the performance of both tasks at the same time.

In view of problems existing in the related arts, the present disclosure provides a method for generating a speech. FIG. 1 shows a flowchart of a method for generating a speech. As shown in FIG. 1, the method for generating the speech includes at least steps S110 to S130.

In the step S110, a speech feature vector of a to-be-processed speech is acquired, and the speech feature vector is input into a speech generation model to obtain a language unit vector.

In the step S120, a text feature vector is acquired, and a to-be-processed feature vector is determined according to the text feature vector and the language unit vector.

In the step S130, the to-be-processed feature vector is input into a sequence-to-sequence model to obtain an acoustic feature vector, and the acoustic feature vector is input into a vocoder to obtain a target speech corresponding to the to-be-processed speech or the text feature vector.

In embodiments of the present disclosure, by acquiring the speech feature vector and the text feature vector, the speech and the text can be received as the inputs, which facilitate the fusion of a TTS task and a VC task to perform multimodal modeling, and improve the performance of the TTS task and the VC task. Furthermore, the speech feature vector and the text feature vector are acquired in the case of a small amount of data, which provides a variety of voice cloning strategies, improves the effect of voice cloning under the small amount of data, reduces the training difficulty and training duration of various models, and supports voice cloning methods in various application scenarios.

The following is a detailed description of each step of the method for generating the speech.

In the step S110, the speech feature vector of the to-be-processed speech is acquired, and the speech feature vector is input into the speech generation model to obtain the language unit vector.

In an embodiment of the present disclosure, the to-be-processed speech may be a speech that needs to be converted for voice conversion.

The voice conversion is a system that automatically converts a speech of speaker A into a speech of speaker B while keeping content of the speech unchanged.

Therefore, the to-be-processed speech may be understood as the speech of speaker A.

Correspondingly, the speech feature vector of the to-be-processed speech may be a Mel-spectrum feature vector extracted according to the to-be-processed speech.

Since the Mel spectrum feature simulates the human ear's processing characteristics for the speech to a certain extent, it can better reflect the human auditory characteristics, thereby improving the user's auditory experience.

After the speech feature vector is acquired, the speech feature vector may be input into the speech generation model, so that the speech generation model outputs a corresponding language unit vector.

Figure 2:
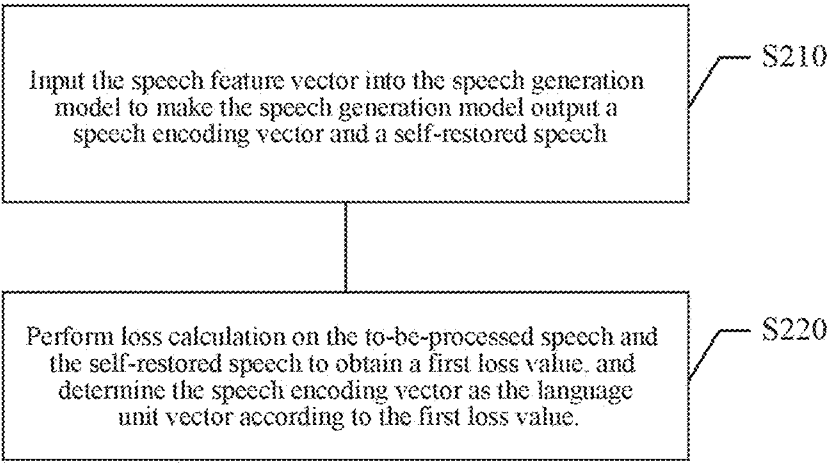
FIG. 2 schematically shows a flowchart of a method for outputting a language unit vector by a speech generation model in an embodiment of the present disclosure.

In an embodiment, FIG. 2 shows a schematic flowchart of a method for outputting a language unit vector by a speech generation model. As shown in FIG. 2, the method includes at least steps S210 and S220. In the step S210, the speech feature vector is input into the speech generation model to make the speech generation model output a speech encoding vector and a self-restored speech.

Figure 3:
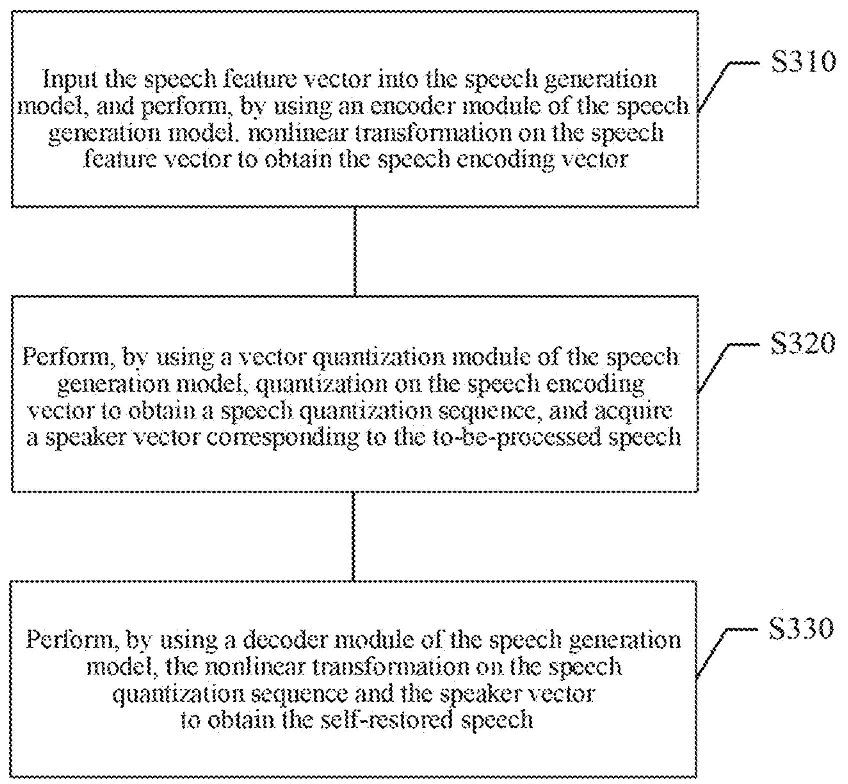
FIG. 3 schematically shows a flowchart of a processing method by a speech generation model in an embodiment of the present disclosure.

In an embodiment, FIG. 3 shows a schematic flowchart of a processing method by a speech generation model. As shown in FIG. 3, the method includes at least steps S310 to S330. In the step S310, the speech feature vector is input into the speech generation model, and nonlinear transformation is performed, by using an encoder module of the speech generation model, on the speech feature vector to obtain the speech encoding vector.

The speech generation model may be a Vector Quantization-Variational AutoEncoder (VQ-VAE) model, or may also be another model, which are not particularly limited in the embodiments.

The VQ-VAE model is an autoencoder with an obvious feature that the encoding vector encoded by it is discrete. VQ-VAE includes an encoding layer and a decoding layer. The speech feature vector may be encoded into a discrete encoding vector through the encoding layer, and the discrete encoding vector may be decoded into a vector through the decoding layer.

Specifically, when the speech generation model is the VQ-VAE model, the speech feature vector is input into the speech generation model, and an encoder module in the VQ-VAE model maps the speech feature vector to a high-dimensional speech encoding vector through the nonlinear transformation. The speech encoding vector may be represented by $z_{1:N}$.

Through the nonlinear transformation of the neural network, the encoder can extract the more abstract and higher-dimensional feature than the input feature.

The encoder module in the VQ-VAE model may be composed of Convolutional Neural Networks (CNN) and Long Short-Term Memory (LSTM).

Specifically, the CNN model may include an input layer, a convolution layer, a pooling layer, a Fully Connected (FC) layer, and an output layer.

An activation function of the convolution layer is ReLU (which is a linear rectification function), while the pooling layer has no activation function. The combination of the convolution layer plus the pooling layer may appear many times in the hidden layer, and the number of times actually depends on the needs of the model.

Alternatively, the combination of the convolution layer plus the convolutional layer or the combination of the convolution layer plus the convolutional layer plus the pooling layer may also be flexibly used, which is not limited upon the building of the model. However, the most common CNN is several combinations of convolutional layers plus pooling layers.

The fully connected layer is after the several convolutional layers and pooling layers. The fully connected layer is actually a Deep Neural Networks (DNN) structure, but the output layer uses the Softmax activation function to perform classification and other tasks.

LSTM is a special Recurrent Neural Network (RNN), which is mainly used to solve the gradient vanishing and gradient exploding problems in a long sequence training process. In simple terms, compared with an ordinary RNN, LSTM can perform better in a longer sequence.

In the step S320, quantization is performed, by using a vector quantization module of the speech generation model, on the speech encoding vector to obtain a speech quantization sequence, and a speaker vector corresponding to the to-be-processed speech is acquired.

After the encoder module of the VQ-VAE model obtains the speech encoding vector $z_{1:N}$, the vector quantization ($\hat{z}_i$=$e_k$) module in the VQ-VAE model may be used to quantize the high-dimensional speech encoding vector into the speech quantization sequence. The speech quantization sequence may be represented by $\hat{z}_{i:N}$.

In an embodiment, based on a codebook in the vector quantization module of the speech generation model, the quantization is performed on the speech encoding vector through a nearest neighbor search algorithm to obtain the speech quantization sequence.

Specifically, based on the codebook in the VQ-VAE model, the continuous speech encoding vector is quantized into a discrete speech quantization sequence through the nearest neighbor search algorithm.

Figure 4:
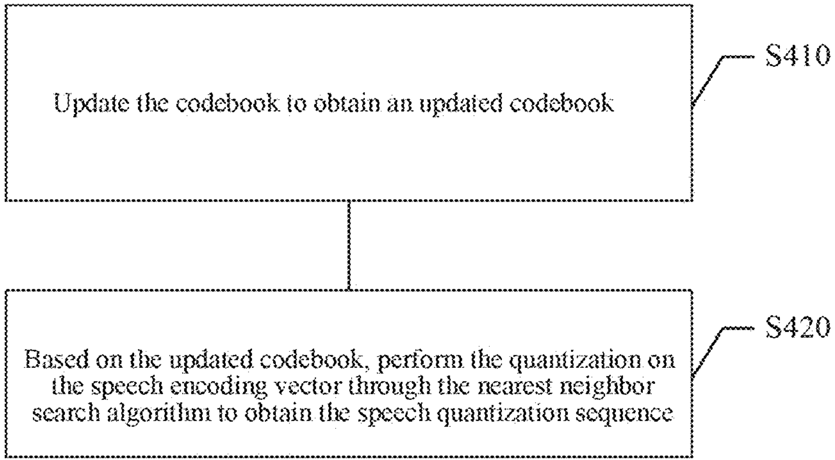
FIG. 4 schematically shows a flowchart of a method for performing quantization to obtain a speech quantization sequence in an embodiment of the present disclosure.

In an embodiment, FIG. 4 shows a schematic flowchart of a method for performing quantization to obtain a speech quantization sequence. As shown in FIG. 4, the method includes at least steps S410 and S420. In the step S410, the codebook is updated to obtain an updated codebook.

Figure 5:
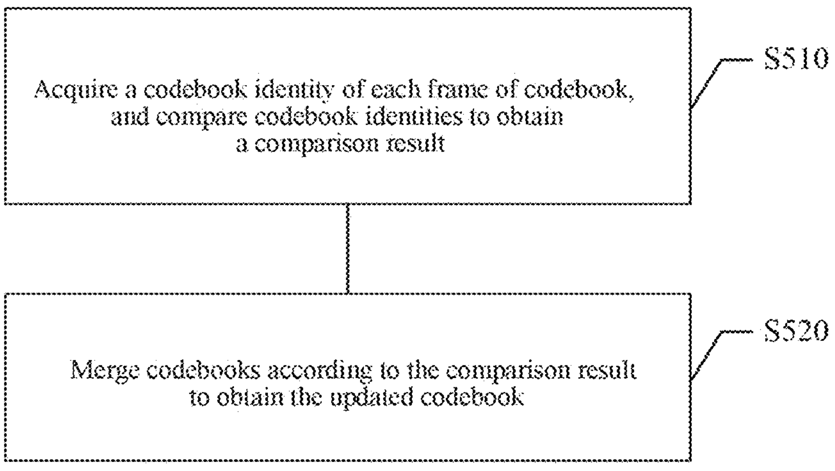
FIG. 5 schematically shows a flowchart of a method for updating a codebook in an embodiment of the present disclosure.

In an embodiment, FIG. 5 shows a schematic flowchart of a method for updating a codebook. As shown in FIG. 5, the method includes at least steps S510 and S520. In the step S510, a codebook identity of each frame of codebook is obtained, and codebook identities are compared to obtain a comparison result.

Each frame of speech feature vector corresponds to a codebook, and for example, codebook representations of five frames of speech feature vectors may be book 1, book 1, book 1, book 2 and book 2.

Considering that the text feature vector may be subsequently processed in a sequence-to-sequence model, the codebook identities may be compared to obtain the comparison result, in order to obtain a sequence representation that better matches the text feature vector.

The comparison result may reflect whether the two or more codebook identities are the same.

In the step S520, codebooks are merged according to the comparison result to obtain the updated codebook.

When the comparison result shows that the two or more codebook identities are the same, the same codebook identities may be merged into one for query by the nearest neighbor search algorithm.

For example, when codebooks of five frames of speech feature vectors are represented as book 1, book 1, book 1, book 2 and book 2, the codebook identities may be merged into book 1 and book 2 to function as the updated codebook.

In the embodiments, updating the codebook through the post-processing network enables the speech quantization sequence to have a sequence representation that better matches the text feature vector, providing data support for a multimodal voice conversion task and facilitating the improvement of the voice conversion performance.

In the step S420, based on the updated codebook, the quantization is performed on the speech encoding vector through the nearest neighbor search algorithm to obtain the speech quantization sequence.

Each updated codebook is a K*D dimensional codebook maintained in the VQ-VAE model.

For example, each codebook may include K D-dimensional encoding vectors $e_1, e_2, \ldots, e_K$. The encoding layer of the VQ-VAE model is used to encode the H'*W'*D dimensional speech feature vector, and then for each D-dimensional vector in the H'*W'*D dimensional speech feature vector, an encoding vector $e_i$ closest to this D-dimensional vector may be found in the codebook, respectively. The encoding vector $e_i$ is a vector in the codebook, and the D-dimensional vector is represented by an index of the encoding vector $e_i$, obtaining the discrete H'*W' dimensional vector, where K, D, H' and W' represent dimensions, respectively.

Furthermore, according to a preset discrete encoding method, the discrete H'*W' dimensional vector is converted into the speech quantization sequence.

The preset discrete encoding method may be one-hot encoding or other types of encoding methods, which is not particularly limited in the embodiments.

Specifically, a codebook with the one-hot encoding method is used to convert, by means of the lookup table, the discrete H'*W' dimensional vector into another discrete H'*W' dimensional coding vector which is encoded by the codebook with the one-hot encoding method, and then the speech quantization sequence is obtained according to the converted discrete H'*W' dimensional encoding vector.

For example, after a discrete 3*3 vector is converted into another discrete 3*3 encoding vector encoded in a codebook with the one-hot coding method, a 1*9 speech quantization sequence may be obtained according to each element in the converted discrete 3*3 encoding vector.

In the embodiments, the discrete encoding processing is performed by the vector quantization module of the speech generation model on the speech encoding vector to obtain the corresponding speech quantization sequence, which provides a data basis and theoretical support for the speech generation model to output the speech encoding vector and the self-restored speech.

In addition, a speaker vector of a speaker who speaks or emits the to-be-processed speech may also be obtained.

Figure 6:
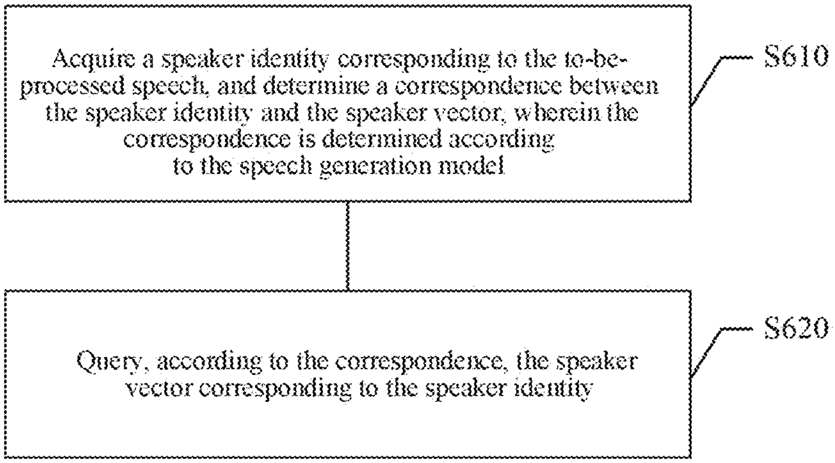
FIG. 6 schematically shows a flowchart of a method for acquiring a speaker vector in an embodiment of the present disclosure.

In an embodiment, FIG. 6 shows a schematic flowchart of a method for acquiring a speaker vector. As shown in FIG. 6, the method includes at least steps S610 and S620. In the step S610, a speaker identity corresponding to the to-be-processed speech is acquired, and a correspondence between the speaker identity and the speaker vector is determined, the correspondence is determined according to the speech generation model.

The speaker identity may uniquely represent identification information of the speaker who speaks or emits the to-be-processed speech.

It should be noted that a table storing the correspondence between the speaker identity and the speaker vector can be also maintained through a first loss value calculated between the self-restored speech and the to-be-processed speech which is output by the decoder in the speech generation model.

In the step S620, the speaker vector corresponding to the speaker identity is queried according to the correspondence.

In the table storing the correspondence between the speaker identity and the speaker vector, the corresponding speaker vector may be queried according to the speaker identity.

In the embodiments, by acquiring the speaker vector maintained by the speech generation model, data support is provided for the decoder module of the speech generation model, and the support provided by the training of the decoder module and the encoder module through the speaker vector and the speech quantization sequence can help the generation by the encoder of the speech generation model and the determination of the speaker vector.

In the step S330, the nonlinear transformation is performed, by using a decoder module of the speech generation model, on the speech quantization sequence and the speaker vector to obtain the self-restored speech.

After receiving the quantized speech quantization sequence and acquiring the speaker vector, the decoder module of the speech generation model may sum the speech quantization sequence and the speaker vector, and then restore the self-restored speech through the nonlinear transformation.

The decoder converts the high-dimensional and abstract hidden feature into the more explicit feature through the nonlinear transformation of the neural network.

It should be noted that when the speech generation model is the VQ-VAE model, the decoder module in the VQ-VAE model may also be composed of CNN and LSTM.

In the embodiments, through the corresponding processing of the encoder module, the vector quantization module and the decoder module in the speech generation model, it is possible to output the self-restored speech to support the training of the speech generation model.

In the step S220, loss calculation is performed on the to-be-processed speech and the self-restored speech to obtain a first loss value, and the speech encoding vector is determined as the language unit vector according to the first loss value.

After the speech generation model outputs the self-restored speech, the first loss value of the speech generation model may be calculated through the to-be-processed speech and the self-restored speech.

Specifically, the first loss value may be calculated by means of an L2 norm loss function.

The L2 norm loss function is shown in formula (1):

$$L = \sum_{i=1}^{n} (y_i - f(x_i))^2 \tag{1}$$

The L2 norm loss function is also called the Least Square Error (LSE). The L2 norm loss function minimizes the sum of the squares of the difference between the target value $y_i$ and the estimated value $f(x_i)$.

This loss is generally used in regression problems, and outliers have a greater impact on this loss.

When the first loss value calculated according to formula (1) reaches a stable value and no longer decreases, it indicates that the speech generation model has been trained.

In this case, the speech encoding vector output by the encoder module in the speech generation model may be determined as an unsupervised language unit vector. The language unit vector may be represented by $k_i$.

In the embodiments, the language unit vector may be obtained through the speech generation model, which provides the sequence-to-sequence model with a data input in a speech modality and provides support for a multi-module speech generation method.

In the step S120, the text feature vector is acquired, and the to-be-processed feature vector is determined according to the text feature vector and the language unit vector.

In an embodiment of the present disclosure, the TTS is a system that automatically converts a natural text into the speech.

Therefore, after the natural text is acquired, a phoneme sequence of the natural text may be extracted as the text feature vector. The phoneme sequence of the natural text may be extracted by using an LSTM model, which is not particularly limited in the embodiments.

After the text feature vector is acquired, the to-be-processed feature vector may be determined according to the text feature vector and the language unit vector.

Figure 7:
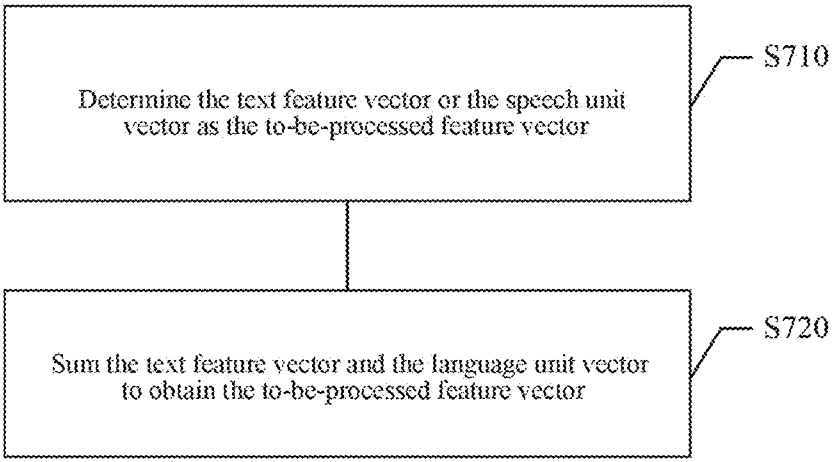
FIG. 7 schematically shows a flowchart of a method for determining a to-be-processed feature vector according to a text feature vector and a language unit vector in an embodiment of the present disclosure.

In an embodiment, FIG. 7 shows a schematic flowchart of a method for determining a to-be-processed feature vector according to a text feature vector and a language unit vector. As shown in FIG. 7, the method includes at least steps S710 and S720. In the step S710, the text feature vector or the language unit vector is determined as the to-be-processed feature vector.

In the TTS field, the speaker adaptation can be divided into supervised speaker adaptation and unsupervised speaker adaptation. The supervised speaker adaptation means that <text, speech> paired data is required during adaptation, while the unsupervised speaker adaptation means that only speech data is required during the adaptation without the corresponding text.

Previous researches have shown that in the supervised speaker adaptation, a small amount of <text, speech> paired data of the target speaker is used to fine-tune a multi-speaker base model, thereby achieving a high-quality effect.

However, in the unsupervised speaker adaptation, fine-tuning the model is not possible.

A common unsupervised speaker adaptation method uses a speaker recognition model to extract a speaker vector from a speech, and then uses this speaker vector to synthesize the speech of the speaker.

It is obvious that the unsupervised speaker adaptation is not achieved by the trained model, and the performance of this method will not improve much as the amount of data increases.

Therefore, in the unsupervised speaker adaptation, the text feature vector may be determined as the to-be-processed feature vector to achieve the TTS effect through the subsequent sequence-to-sequence model and vocoder.

For the voice conversion, the language unit vector may be determined as the to-be-processed feature vector so as to complete the voice conversion task through the subsequent sequence-to-sequence model and vocoder.

In the step S720, the text feature vector and the language unit vector are summed to obtain the to-be-processed feature vector.

In order to improve the effect of the voice conversion task, the text feature vector and the language unit vector may be summed to obtain the to-be-processed feature vector.

It should be noted that since the codebook in the vector quantization module of the speech generation model has been updated in the process of obtaining the language unit vector, the language unit vector quite matches the text feature vector, and the text feature vector and the language unit vector may be directly summed.

When the to-be-processed feature vector is obtained by summing the text feature vector and the language unit vector, the to-be-processed feature vector is equivalent to adding the performance of the text modality on the basis of the language modality.

Therefore, the to-be-processed feature vector in this case is the enhanced data performance. Based on this, the performance of the voice conversion task implemented by the to-be-processed feature vector is better.

Modality refers to a source or form of information.

For example, a piece of information may be expressed in a plurality of forms such as speech, video, text, and images. Each form of expression of the information may be called a modality of the information. On this basis, multi-modality is the integration of text, speech, vision, action, environment and the like. MultiModal Machine Learning (MMML) refers to an ability to process and understand multi-source modal information through a machine learning method. For example, the current popular research direction is multi-modal learning between images, videos, audio, and semantics.

In the embodiments, different to-be-processed feature vectors can be determined as the basis for the subsequent model processing, depending on the TTS task and the voice conversion task, providing data support for improving the performance of the TTS task and the voice conversion task.

In the step S130, the to-be-processed feature vector is input into the sequence-to-sequence model to obtain the acoustic feature vector, and the acoustic feature vector is input into the vocoder to obtain the target speech corresponding to the to-be-processed speech or the text feature vector.

In an embodiment of the present disclosure, after the to-be-processed feature vector is determined, the to-be-processed feature vector may be input into the sequence-to-sequence model to obtain the corresponding acoustic feature vector.

Figure 8:
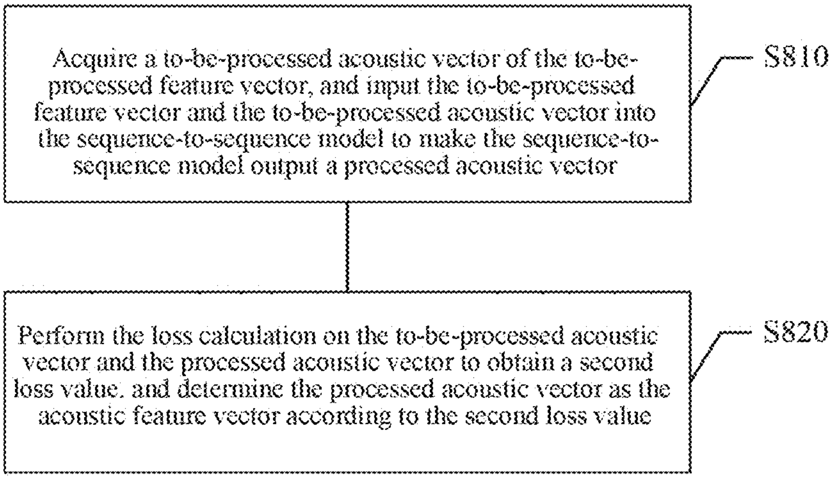
FIG. 8 schematically shows a flowchart of a method for outputting an acoustic feature vector by a sequence-to-sequence model in an embodiment of the present disclosure.

In an embodiment, FIG. 8 shows a schematic flowchart of a method for outputting an acoustic feature vector by a sequence-to-sequence model. As shown in FIG. 8, the method includes at least steps S810 and S820. In the step S810, a to-be-processed acoustic vector of the to-be-processed feature vector is acquired, and the to-be-processed feature vector and the to-be-processed acoustic vector are inputted into the sequence-to-sequence model to make the sequence-to-sequence model output a processed acoustic vector.

The to-be-processed acoustic vector may also be a Mel-spectrum feature vector.

Figure 9:
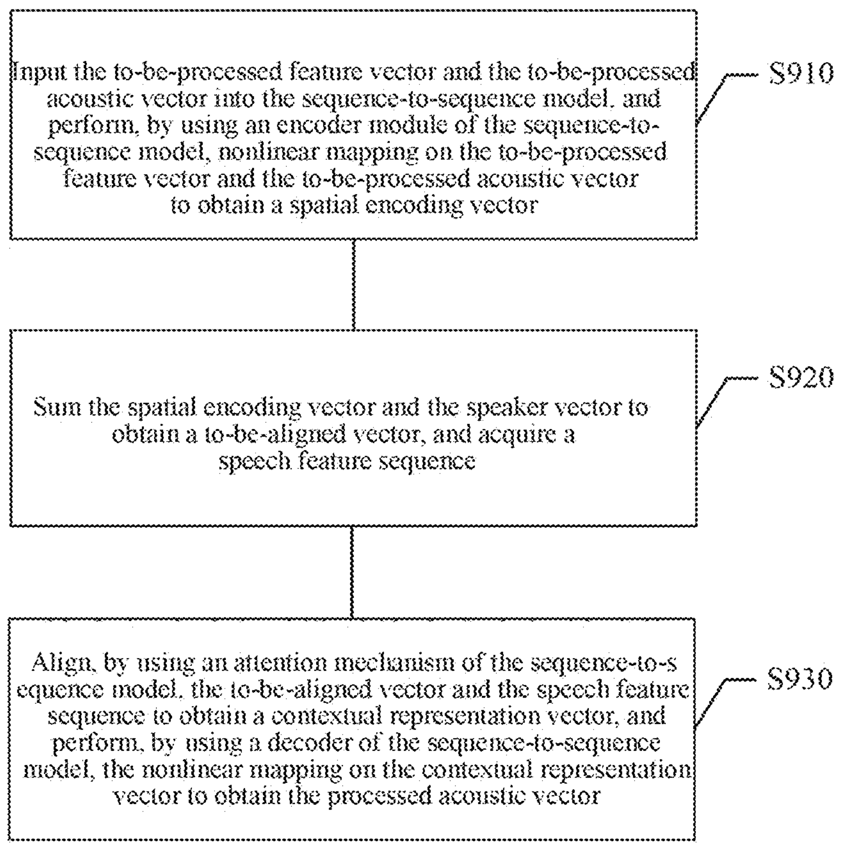
FIG. 9 schematically shows a flowchart of a processing method by a sequence-to-sequence model in an embodiment of the present disclosure.

In an embodiment, FIG. 9 shows a schematic flowchart of a processing method by a sequence-to-sequence model. As shown in FIG. 9, the method may include at least steps S910 to S930. In the step S910, the to-be-processed feature vector and the to-be-processed acoustic vector are input into the sequence-to-sequence model, and nonlinear mapping is performed, by using an encoder module of the sequence-to-sequence model, on the to-be-processed feature vector and the to-be-processed acoustic vector to obtain a spatial encoding vector.

The sequence-to-sequence model may be a sequence-to-sequence (Seq2seq) model based on an attention mechanism, or may be other models, which is not particularly limited in the embodiments.

When the sequence-to-sequence model is the Seq2seq model based on the attention mechanism, the sequence-to-sequence model may include the encoder module, an attention mechanism, and a decoder module.

The encoder module of the sequence-to-sequence model may be configured to acquire a representation sequence corresponding to the to-be-processed feature vector and the to-be-processed acoustic vector, the attention mechanism may be configured to generate a fixed-length semantic representation based on the representation sequence, and the decoder module may be configured to acquire the acoustic vector based on the semantic representation.

Specifically, the encoder module of the sequence-to-sequence model may include a FeatureEmbedding layer, a Convolutional Pre-Net, a Dense Pre-Net, a Convolution Bank+Highway network+bidirectional Gated Recurrent Unit (CBHG, that is, the CBHG consists of the convolutional bank, the highway network, and the bidirectional gated recurrent unit) sub-model, a Down-sampling Convolution layer.

First, the to-be-processed feature vector is encoded using the FeatureEmbedding layer and then input into the Convolutional Pre-net to perform the nonlinear transformation on the encoded to-be-processed feature vector and the to-be-processed acoustic vector, thereby improving the convergence and generalization ability of the sequence-to-sequence model based on the attention mechanism. In addition, the number of speech frames corresponding to the to-be-processed acoustic vector is input into the Dense Pre-net to obtain the corresponding deep feature. Then, an output of the Convolutional Pre-net and an output of the Dense Pre-net are input into the CBHG sub-model together to extract the corresponding contextual feature, which is then input into the Down-sampling Convolution to reduce the amount of calculation and the receptive field, and the corresponding spatial encoding vector is finally obtained.

Therefore, the to-be-processed feature vector and the to-be-processed acoustic vector are nonlinearly transformed and mapped to a high-dimensional spatial encoding vector through the encoder module of the sequence-to-sequence model. The spatial encoding vector may be represented by $h_t$.

In the step S920, the spatial encoding vector and the speaker vector are summed to obtain a to-be-aligned vector, and a speech feature sequence is acquired.

Since multi-speaker modeling is required, the attention mechanism of the sequence-to-sequence model may also receive the speaker vector as the input.

To input the speaker vector, the spatial encoding vector and the speaker vector may be summed to obtain the to-be-aligned vector.

Furthermore, since the attention mechanism is an autoregressive model, the speech feature sequence may also be acquired. The speech feature sequence may be represented by $m_{t-1}$. When t=1, the speech feature sequence is initialized to a sequence of all 0 s; and when t=2 and subsequent times, the speech feature sequence is a feedback sequence of the decoder module for the previous moment.

In the step S930, the to-be-aligned vector and the speech feature sequence are aligned, by using the attention mechanism of the sequence-to-sequence model, to obtain a contextual representation vector, and the nonlinear mapping is performed, by using the decoder of the sequence-to-sequence model, on the contextual representation vector to obtain the processed acoustic vector.

Since the speech feature vector is usually longer than the to-be-aligned vector, the to-be-aligned vector and the speech feature sequence may be aligned to obtain the contextual representation vector.

Specifically, a manner to align the to-be-aligned vector and the speech feature sequence may be performing a dot product calculation on the to-be-aligned vector and the speech feature sequence.

Moreover, the contextual representation vector obtained by aligning the to-be-aligned vector and the speech feature sequence can reflect a contextual relationship of the context, thus ensuring the effect of speech generation.

Furthermore, the decoder module of the sequence-to-sequence model mainly returns, through the nonlinear mapping, the contextual representation vector obtained by aligning the to-be-aligned vector and the speech feature sequence to an original speech acoustic feature space, so as to obtain the processed acoustic vector. Therefore, the processed acoustic vector may be a Mel spectrum, and the processed acoustic vector may be represented by m.

In the embodiments, by correspondingly processing the to-be-processed feature vector and the to-be-processed acoustic vector by the encoder module, the attention mechanism and the decoder module in the sequence-to-sequence model, a fusion method can be provided for the TTS task and the VC task, thereby improving the voice cloning effect under a small amount of data. In addition, since a variety of input data can be received, the voice cloning in a variety of scenarios is supported.

In the step S820, the loss calculation is performed on the to-be-processed acoustic vector and the processed acoustic vector to obtain a second loss value, and the processed acoustic vector is determined as the acoustic feature vector according to the second loss value.

After the sequence-to-sequence model outputs the processed acoustic vector, the second loss value between the to-be-processed acoustic vector and the processed acoustic vector may be calculated according to the above formula (1).

When the second loss value calculated according to the formula (1) reaches a stable value and no longer decreases, it indicates that the sequence-to-sequence model has been trained.

In this case, the processed acoustic vector output by the sequence-to-sequence model which has been trained to be convergent may be determined as the acoustic feature vector.

After the sequence-to-sequence model outputs the acoustic feature vector, the acoustic feature vector may be further input into the vocoder to obtain the target speech for the TTS task or the voice conversion.

Figure 10:
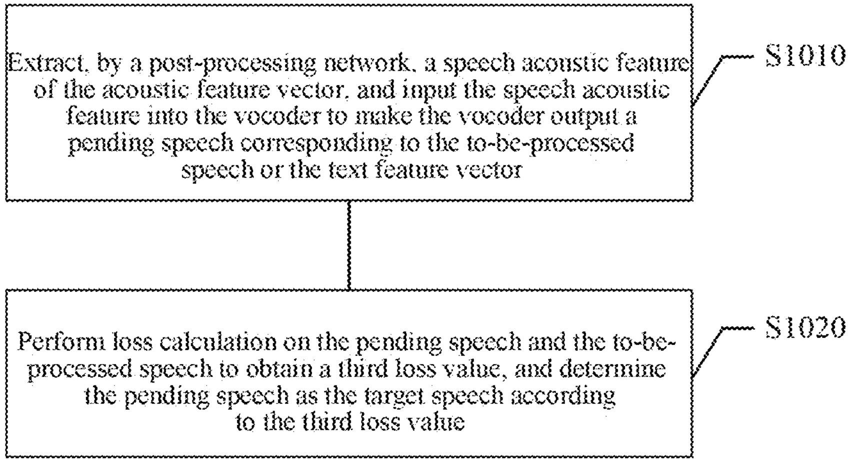
FIG. 10 schematically shows a flowchart of a method for outputting a target speech according to a generator in an embodiment of the present disclosure.

In an embodiment, FIG. 10 shows a schematic flowchart of a method for outputting a target speech according to a generator. As shown in FIG. 10, the method includes at least steps S1010 and S1020. In the step S1010, a speech acoustic feature of the acoustic feature vector is extracted by a post-processing network, and the speech acoustic feature is input into the vocoder to make the vocoder output a pending speech corresponding to the to-be-processed speech or the text feature vector.

The post-processing network is mainly set up to improve the generation of the higher-precision speech acoustic feature. The speech acoustic feature may be represented by $\hat{x}$.

The post-processing network may be a CNN network, or an LSTM network, etc., which is not particularly limited in the embodiments.

The vocoder is a system that converts the acoustic feature, such as the Mel spectrum, into a speech audio.

The vocoder may be a Wavenet model, a Griffin-Lim algorithm, a Generative Adversarial Network (GAN), or the like, which is not particularly limited in the embodiments.

Specifically, the Wavenet model is a sequence generation model that may be used for speech generation modeling. In the TTS acoustic model modeling, the Wavenet may directly learn the mapping of the sample value sequence, so it has a good synthesis effect.

At present, the Wavenet has applications in the TTS acoustic model modeling and the vocoder, and has great potential in the TTS field.

The Wavenet model may predict a result of the t-th point based on the first t−1 points of a sequence, so it may be used to predict a numerical value of the sampling point in the speech.

The Griffin-Lim is an algorithm for reconstructing a speech under a condition that only an amplitude spectrum is known but a phase spectrum is unknown.

The implementation for the Griffin-Lim algorithm is relatively simple. The Griffin-Lim algorithm is an iterative algorithm. The iterative process is to first randomly initialize a phase spectrum, then the phase spectrum and the known amplitude spectrum are used to synthesize a new speech through the inverse short-time Fourier transform (ISTFT), and then the short-time Fourier transform or the short-term Fourier transform (STFT) is performed on the synthesized speech to obtain a new amplitude spectrum and phase spectrum. Finally, the new amplitude spectrum is discarded, the phase spectrum and the known amplitude spectrum are used to synthesize the speech. The repetition is performed in this way.

The GAN network is a machine learning method proposed by Ian J. Goodfello et al. in the paper of Generative Adversarial Nets in 2014. In the GAN network, there are two models, which are respectively a generative model G and a discriminative model D.

Taking the picture generation as an example, G is a network that generates the picture, and it accepts a random noise z and then generates the picture through this noise. The generated data is recorded as G(z).

D is a discriminative network that discriminates whether a picture is "real" (i.e., whether it is fabricated). Its input parameter is x, which represents a picture, and its output D(x) represents a probability of x being a real picture. If the output is 1, it means it is a real picture, and if the output is 0, it means it cannot be the real picture.

During the training process, a goal of the generative network G is to generate a fake image to deceive the discriminative network D, while a goal of the discriminative network D is to be able to discriminate whether a certain picture is generated by G. This becomes a game process. In addition, the capabilities of G and D are gradually improved during the training process. In the most ideal case, D (G(z))=0.5.

The speech acoustic feature extracted by the post-processing network is processed by the vocoder to output the pending speech.

When the TTS task is performed, the pending speech may be a speech synthesized according to the text feature vector, and when the VC task is performed, the pending speech may be a speech converted according to the to-be-processed speech.

In the step S1020, the loss calculation is performed on the pending speech and the to-be-processed speech to obtain a third loss value, and the pending speech is determined as the target speech according to the third loss value.

Figure 11:
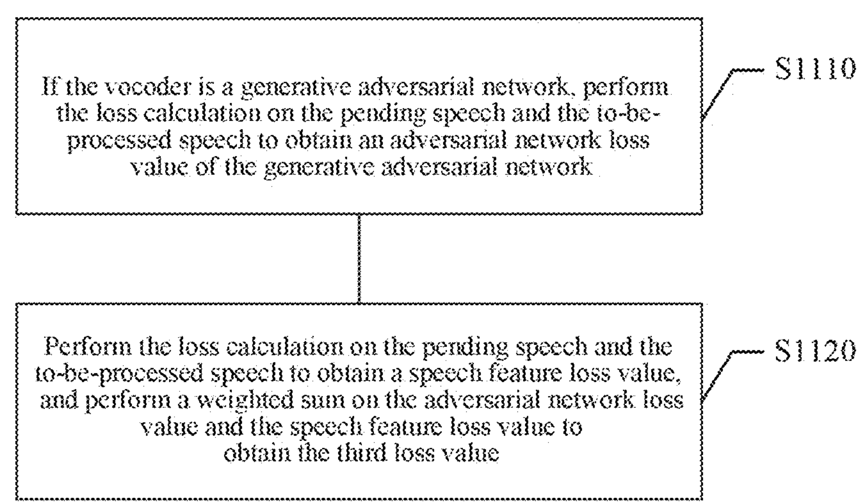
FIG. 11 schematically shows a flowchart of a method for performing loss calculation to obtain a third loss value in an embodiment of the present disclosure.

In an embodiment, FIG. 11 shows a schematic flowchart of a method for performing loss calculation to obtain a third loss value. As shown in FIG. 11, the method includes at least steps S1110 and S1120. In the step S1110, if the vocoder is a generative adversarial network, the loss calculation is performed on the pending speech and the to-be-processed speech to obtain an adversarial network loss value of the generative adversarial network.

When the vocoder adopts the generative adversarial network, a loss function of the generative adversarial network is shown in formula (2):

$$\min_G \max_D V(D, G) = E_{x \sim P_{data}(x)}[\log(D(x))] + E_{z \sim P_z(z)}[\log(1 - D(G(z)))] \quad (2)$$

where, D(x) represents discrimination for a real sample. Here, it is desired that its discrimination result is as close to 1 as possible, so the loss function is log(D(x)). z is a random input, and G(z) represents the generated sample. For the generated sample, it is desired that the discrimination result D(G(z)) of the discriminator is as close to 0 as possible, that is, to maximize the total value, so the overall expression is shown in formula (2).

Therefore, by performing the loss calculation on the pending speech and the to-be-processed speech according to the formula (2), the adversarial network loss value of the generative adversarial network can be obtained.

In the step S1120, the loss calculation is performed on the pending speech and the to-be-processed speech to obtain a speech feature loss value, and a weighted sum is performed on the adversarial network loss value and the speech feature loss value to obtain a third loss value.

Furthermore, the loss calculation is performed on the pending speech and the to-be-processed speech according to formula (1) to obtain the speech feature loss value.

Furthermore, corresponding weights may be set for the adversarial network loss value and the speech feature loss value according to empirical values, so as to perform the weighted sum calculation on the adversarial network loss value and the speech feature loss value to obtain the third loss value.

It should be noted that when the vocoder adopts other networks or models, the corresponding loss value may be calculated only according to formula (1) as the third loss value.

In the embodiments, the corresponding loss value calculation methods are set according to different vocoder contents, which is more targeted and can ensure the accuracy of training results of different types of vocoders, further ensuring the reliability of the target speech generation.

When the third loss value reaches a stable value and no longer decreases, it indicates that the vocoder has been trained to be convergent and can be put into an application stage. Therefore, it can be determined that the pending speech is the target speech.

The following is a detailed description of the method for generating the speech in embodiments of the present disclosure in conjunction with an application scenario.

Figure 12:
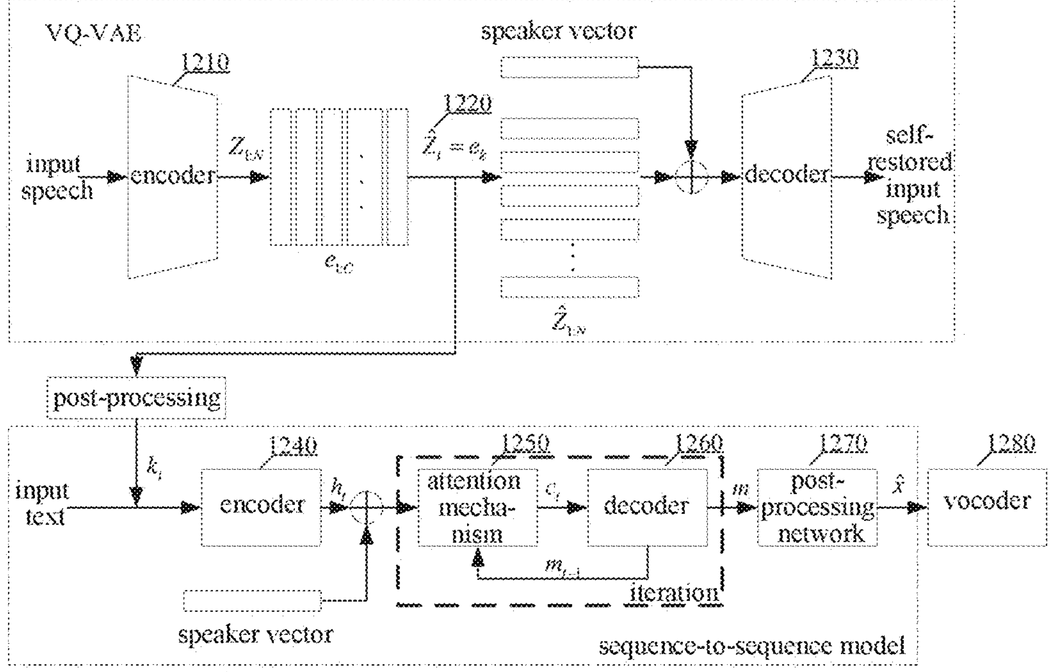
FIG. 12 schematically shows a schematic diagram of a framework of a speech generation model in an application scenario in an embodiment of the present disclosure.

FIG. 12 shows a schematic diagram of a framework of a speech generation model in an application scenario. As shown in FIG. 12, the VQ-VAE model includes an encoder module 1210, a vector quantization module 1220 and a decoder module 1230.

First, a speech feature vector of a speech is input into the encoder module 1210 of the VQ-VAE model.

The to-be-processed speech may be a speech that needs to be converted for voice conversion. Correspondingly, the speech feature vector of the to-be-processed speech may be a Mel-spectrum feature vector extracted according to the to-be-processed speech Furthermore, the nonlinear transformation is performed, by using the encoder module of the speech generation model, on the speech feature vector to obtain a high-dimensional speech encoding vector. The speech encoding vector may be represented by $z_{1:N}$.

The encoder module in the VQ-VAE model may be composed of CNN and LSTM.

Then, quantization is performed, by using the vector quantization module 1220 of the speech generation model, on the speech encoding vector to obtain a speech quantization sequence.

After the encoder module of the VQ-VAE model obtains the speech encoding vector $z_{1:N}$, the vector quantization ($\hat{z}_i$=$e_k$) module in the VQ-VAE model may be used to quantize the high-dimensional speech encoding vector into the speech quantization sequence. The speech quantization sequence may be represented by $\hat{z}_{i:N}$.

Based on a codebook in the vector quantization module of the speech generation model, the quantization is performed on the speech encoding vector through a nearest neighbor search algorithm to obtain the speech quantization sequence.

Specifically, based on the updated codebook in the VQ-VAE model, the continuous speech encoding vector is quantized into a discrete speech quantization sequence through the nearest neighbor search algorithm.

When the codebook is updated, the codebook identity of each frame of codebook may be acquired, and the codebook identities may be compared to obtain the comparison result.

Each frame of speech feature vector corresponds to a codebook, and for example, codebook representations of five frames of speech feature vectors may be book 1, book 1, book 1, book 2 and book 2.

Considering that the text feature vector may be subsequently processed in a sequence-to-sequence model, the codebook identities may be compared to obtain the comparison result, in order to obtain a sequence representation that better matches the text feature vector.

The comparison result may reflect whether the two or more codebook identities are the same.

Codebooks are merged according to the comparison result to obtain the updated codebook.

When the comparison result shows that the two or more codebook identities are the same, the same codebook identities may be merged into one for query by the nearest neighbor search algorithm.

For example, when codebooks of five frames of speech feature vectors are represented as book 1, book 1, book 1, book 2 and book 2, the codebook identities may be merged into book 1 and book 2 to function as the updated codebook.

Based on the updated codebook, the quantization is performed on the speech encoding vector through the nearest neighbor search algorithm to obtain the speech quantization sequence.

Each updated codebook is a K*D dimensional codebook maintained in the VQ-VAE model.

For example, each codebook may include K D-dimensional encoding vectors $e_1, e_2, \ldots, e_K$. The encoding layer of the VQ-VAE model is used to encode the H'*W'*D dimensional speech feature vector, and then for each D-dimensional vector in the H'*W'*D dimensional speech feature vector, an encoding vector $e_1$ closest to this D-dimensional vector may be found in the codebook, respectively. The encoding vector $e_i$ is a vector in the codebook, and the D-dimensional vector is represented by an index of the encoding vector et, obtaining the discrete H'*W' dimensional vector, where K, D, H' and W' represent dimensions, respectively.

Furthermore, according to a preset discrete encoding method, the discrete H'*W' dimensional vector is converted into the speech quantization sequence.

The preset discrete encoding method may be one-hot encoding or other types of encoding methods, which is not particularly limited in the embodiments.

Specifically, a codebook with the one-hot encoding method is used to convert, by means of the lookup table, the discrete H'*W' dimensional vector into another discrete H'*W' dimensional coding vector which is encoded by the codebook with the one-hot encoding method, and then the speech quantization sequence is obtained according to the converted discrete H'*W' dimensional encoding vector.

For example, after a discrete 3*3 vector is converted into another discrete 3*3 encoding vector encoded in a codebook with the one-hot coding method, a 1*9 speech quantization sequence may be obtained according to each element in the converted discrete 3*3 encoding vector.

In addition, a speaker vector of a speaker who speaks or emits the to-be-processed speech may also be obtained.

A speaker identity corresponding to the to-be-processed speech is acquired, and a correspondence between the speaker identity and the speaker vector is determined, the correspondence is determined according to the speech generation model The speaker identity may uniquely represent identification information of the speaker who speaks or emits the to-be-processed speech.

It should be noted that a table storing the correspondence between the speaker identity and the speaker vector can be also maintained through a first loss value calculated between the self-restored speech and the to-be-processed speech which is output by the decoder in the speech generation model.

The speaker vector corresponding to the speaker identity is queried according to the correspondence.

In the table storing the correspondence between the speaker identity and the speaker vector, the corresponding speaker vector may be queried according to the speaker identity.

Finally, the nonlinear transformation is performed, by using a decoder module of the speech generation model, on the speech quantization sequence and the speaker vector to obtain the self-restored speech.

After receiving the quantized speech quantization sequence and acquiring the speaker vector, the decoder module of the speech generation model may sum the speech quantization sequence and the speaker vector, and then restore the self-restored speech through the nonlinear transformation.

Loss calculation is performed on the to-be-processed speech and the self-restored speech to obtain a first loss value, and the speech encoding vector is determined as the language unit vector according to the first loss value.

After the speech generation model outputs the self-restored speech, the first loss value of the speech generation model may be calculated through the to-be-processed speech and the self-restored speech.

Specifically, the first loss value may be calculated by means of an L2 norm loss function. The L2 norm loss function is shown in the above formula (1).

When the first loss value calculated according to formula (1) reaches a stable value and no longer decreases, it indicates that the speech generation model has been trained.

In this case, the speech encoding vector output by the encoder module in the speech generation model may be determined as an unsupervised language unit vector. The language unit vector may be represented by $k_i$.

The unsupervised learning can discover or extract the useful information representation through its own data. The VQ-VAE unsupervised algorithm in this application scenario can extract the discrete information representation from data in different formats.

This discrete representation unit is very close to the phoneme in the language text, and it is very appropriate to use this unsupervised discrete language unit as an input of an end-to-end language synthesis model.

Moreover, it is also a perfect fit for the problem to be solved.

In order to combine the TTS task and the VC task into one system, a common input of this system can be looked for, that is, the phoneme extracted from the text and the unsupervised language unit extracted by the VQ-VAE model.

In FIG. 12, a sequence-to-sequence model may include an encoder module 1240, an attention mechanism 1250, a decoder module 1260, and a post-processing network 1270.

In order to the fusion of the TTS task and the VC task, the text feature vector may also be acquired.

After a natural text is acquired, a phoneme sequence of the natural text may be extracted as the text feature vector.

After the text feature vector is acquired, a to-be-processed feature vector may be determined according to the text feature vector and the language unit vector.

In the unsupervised speaker adaptation, the text feature vector may be determined as the to-be-processed feature vector to achieve the TTS effect through the subsequent sequence-to-sequence model and vocoder.

For the voice conversion, the language unit vector may be determined as the to-be-processed feature vector so as to complete the voice conversion task through the subsequent sequence-to-sequence model and vocoder.

In order to improve the effect of the voice conversion task, the text feature vector and the language unit vector may be summed to obtain the to-be-processed feature vector.

It should be noted that since the codebook in the vector quantization module of the speech generation model has been updated in the process of obtaining the language unit vector, the language unit vector quite matches the text feature vector, and the text feature vector and the language unit vector may be directly summed.

When the to-be-processed feature vector is obtained by summing the text feature vector and the language unit vector, the to-be-processed feature vector is equivalent to adding the performance of the text modality on the basis of the language modality.

Therefore, the to-be-processed feature vector in this case is the enhanced data performance. Based on this, the performance of the voice conversion task implemented by the to-be-processed feature vector is better.

Furthermore, the to-be-processed acoustic vector of the to-be-processed feature vector is acquired, and the to-be-processed acoustic vector may also be a Mel-spectrum feature vector.

The to-be-processed feature vector and the to-be-processed acoustic vector are input into the sequence-to-sequence model, and nonlinear mapping is performed, by using the encoder module 1240 of the sequence-to-sequence model, on the to-be-processed feature vector and the to-be-processed acoustic vector to obtain a spatial encoding vector.

The sequence-to-sequence model may be a sequence-to-sequence model based on an attention mechanism.

Specifically, the encoder module of the sequence-to-sequence model may include a FeatureEmbedding layer, a Convolutional Pre-Net, a Dense Pre-Net, a CBHG sub-model, a Down-sampling Convolution layer.

First, the to-be-processed feature vector is encoded using the FeatureEmbedding layer and then input into the Convolutional Pre-net to perform the nonlinear transformation on the encoded to-be-processed feature vector and the to-be-processed acoustic vector, thereby improving the convergence and generalization ability of the sequence-to-sequence model based on the attention mechanism. In addition, the number of speech frames corresponding to the to-be-processed acoustic vector is input into the Dense Pre-net to obtain the corresponding deep feature. Then, an output of the Convolutional Pre-net and an output of the Dense Pre-net are input into the CBHG sub-model together to extract the corresponding contextual feature, which is then input into the Down-sampling Convolution to reduce the amount of calculation and the receptive field, and the corresponding spatial encoding vector is finally obtained.

Therefore, the to-be-processed feature vector and the to-be-processed acoustic vector are nonlinearly transformed and mapped to a high-dimensional spatial encoding vector through the encoder module of the sequence-to-sequence model. The spatial encoding vector may be represented by $h_t$.

The spatial encoding vector and the speaker vector are summed to obtain a to-be-aligned vector, and a speech feature sequence is acquired.

Since multi-speaker modeling is required, the attention mechanism 1250 of the sequence-to-sequence model may also receive the speaker vector as the input.

To input the speaker vector, the spatial encoding vector and the speaker vector may be summed to obtain the to-be-aligned vector.

Furthermore, since the attention mechanism 1250 is an autoregressive model, the speech feature sequence may also be acquired. The speech feature sequence may be represented by $m_{t-1}$. When t=1, the speech feature sequence is initialized to a sequence of all 0 s; and when t=2 and subsequent times, the speech feature sequence is a feedback sequence of the decoder module 1260 for the previous moment.

The to-be-aligned vector and the speech feature sequence are aligned, by using the attention mechanism 1250 of the sequence-to-sequence model, to obtain a contextual representation vector, and the nonlinear mapping is performed, by using the decoder 1260 of the sequence-to-sequence model, on the contextual representation vector to obtain the processed acoustic vector.

Since the speech feature vector is usually longer than the to-be-aligned vector, the to-be-aligned vector and the speech feature sequence may be aligned to obtain the contextual representation vector.

Specifically, a manner to align the to-be-aligned vector and the speech feature sequence may be performing a dot product calculation on the to-be-aligned vector and the speech feature sequence.

Moreover, the contextual representation vector obtained by aligning the to-be-aligned vector and the speech feature sequence can reflect a contextual relationship of the context, thus ensuring the effect of speech generation.

Furthermore, the decoder module 1260 of the sequence-to-sequence model mainly returns, through the nonlinear mapping, the contextual representation vector obtained by aligning the to-be-aligned vector and the speech feature sequence to an original speech acoustic feature space, so as to obtain the processed acoustic vector. Therefore, the processed acoustic vector may be a Mel spectrum, and the processed acoustic vector may be represented by m.

After the sequence-to-sequence model outputs the processed acoustic vector, the second loss value between the to-be-processed acoustic vector and the processed acoustic vector may be calculated according to the above formula (1).

When the second loss value calculated according to the formula (1) reaches a stable value and no longer decreases, it indicates that the sequence-to-sequence model has been trained.

In this case, the processed acoustic vector output by the sequence-to-sequence model which has been trained to be convergent may be determined as the acoustic feature vector.

A speech acoustic feature of the acoustic feature vector is extracted by the post-processing network 1270, and the speech acoustic feature is input into the vocoder 1280 to make the vocoder 1280 output a pending speech corresponding to the to-be-processed speech or the text feature vector.

The post-processing network 1270 is mainly set up to improve the generation of the higher-precision speech acoustic feature. The speech acoustic feature may be represented by $\hat{x}$.

The vocoder may be a Wavenet model, a Griffin-Lim algorithm, a GAN network, or the like, which is not particularly limited in the embodiments.

The speech acoustic feature extracted by the post-processing network 1270 is processed by the vocoder 1280 to output the pending speech.

When the TTS task is performed, the pending speech may be a speech synthesized according to the text feature vector, and when the VC task is performed, the pending speech may be a speech converted according to the to-be-processed speech.

If the vocoder 1280 is a generative adversarial network, the loss calculation is performed on the pending speech and the to-be-processed speech to obtain an adversarial network loss value of the generative adversarial network.

When the vocoder 1280 adopts the generative adversarial network, a loss function of the generative adversarial network is shown in the above formula (2). Therefore, by performing the loss calculation on the pending speech and the to-be-processed speech according to the formula (2), the adversarial network loss value of the generative adversarial network can be obtained.

The loss calculation is performed on the pending speech and the to-be-processed speech to obtain a speech feature loss value, and a weighted sum is performed on the adversarial network loss value and the speech feature loss value to obtain a third loss value.

Furthermore, the loss calculation is performed on the pending speech and the to-be-processed speech according to formula (1) to obtain the speech feature loss value.

Furthermore, corresponding weights may be set for the adversarial network loss value and the speech feature loss value according to empirical values, so as to perform the weighted sum calculation on the adversarial network loss value and the speech feature loss value to obtain the third loss value.

It should be noted that when the vocoder 1280 adopts other networks or models, the corresponding loss value may be calculated only according to formula (1) as the third loss value.

When the third loss value reaches a stable value and no longer decreases, it indicates that the vocoder 1280 has been trained to be convergent and can be put into an application stage. Therefore, it can be determined that the pending speech is the target speech.

In the method for generating the speech in embodiments of the present disclosure, by acquiring the speech feature vector and the text feature vector, the speech and the text can be received as the inputs, which facilitate the fusion of a TTS task and a VC task to perform multimodal modeling, and improve the performance of the TTS task and the VC task. Furthermore, the speech feature vector and the text feature vector are acquired in the case of a small amount of data, which provides a variety of voice cloning strategies, improves the effect of voice cloning under the small amount of data, reduces the training difficulty and training duration of various models, and supports voice cloning methods in various application scenarios.

In addition, the method for generating the speech in this application scenario can achieve a good effect in the supervised speaker adaptation through the fine-tuning, and in the unsupervised speaker adaptation, the performance can also be improved as the amount of data increases.

In the supervised voice cloning, this performance improvement is attributed to the use of the unsupervised language unit as a means of data augmentation, which can help the model perform better with fewer data samples.

In addition, whether in the supervised or the unsupervised voice cloning, the use of the unsupervised language unit can help the attention mechanism learn the more robust alignment result, thereby improving the performance of the model with few samples.

In the VC task, the performance of this method is also better than that of a single-task VC model, and the improvement is even greater.

Therefore, overall, the multimodal voice cloning system proposed in this application scenario can outperform the single-task TTS or VC model in many scenarios and has strong practical application value.

Figure 13:
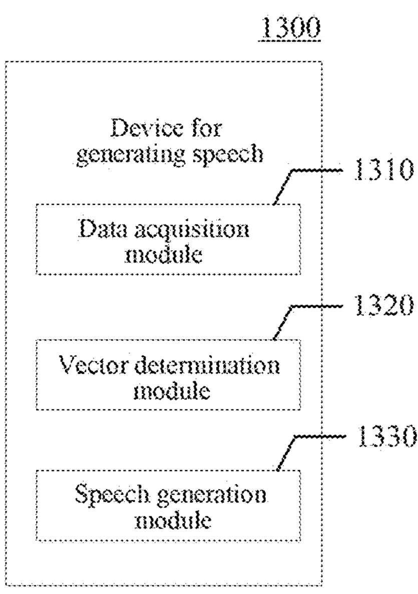
FIG. 13 schematically shows a structural schematic diagram of a device for generating a speech in an embodiment of the present disclosure.

In addition, in embodiments of the present disclosure, there is further provided a device for generating a speech. FIG. 13 shows a schematic structural diagram of a device for generating a speech. As shown in FIG. 13, the device 1300 for generating the speech may include a data acquisition module 1310, a vector determination module 1320 and a speech generation module 1330.

The data acquisition module 1310 is configured to acquire a speech feature vector of a to-be-processed speech, and input the speech feature vector into a speech generation model to obtain a language unit vector.

The vector determination module 1320 is configured to acquire a text feature vector, and determine a to-be-processed feature vector according to the text feature vector and the language unit vector.

The speech generation module 1330 is configured to input the to-be-processed feature vector into a sequence-to-sequence model to obtain an acoustic feature vector, and input the acoustic feature vector into a vocoder to obtain a target speech corresponding to the to-be-processed speech or the text feature vector.

In an embodiment of the present disclosure, inputting the speech feature vector into the speech generation model to obtain the language unit vector includes:

- inputting the speech feature vector into the speech generation model to make the speech generation model output a speech encoding vector and a self-restored speech; and
- performing loss calculation on the to-be-processed speech and the self-restored speech to obtain a first loss value, and determining the speech encoding vector as the language unit vector according to the first loss value.

In an embodiment of the present disclosure, inputting the speech feature vector into the speech generation model to make the speech generation model output the speech encoding vector and the self-restored speech includes:

- inputting the speech feature vector into the speech generation model, and performing, by using an encoder module of the speech generation model, nonlinear transformation on the speech feature vector to obtain the speech encoding vector;
- performing, by using a vector quantization module of the speech generation model, quantization on the speech encoding vector to obtain a speech quantization sequence, and acquiring a speaker vector corresponding to the to-be-processed speech; and
- performing, by using a decoder module of the speech generation model, the nonlinear transformation on the speech quantization sequence and the speaker vector to obtain the self-restored speech.

In an embodiment of the present disclosure, acquiring the speaker vector corresponding to the to-be-processed speech includes:

acquiring a speaker identity corresponding to the to-be-processed speech, and determining a correspondence between the speaker identity and the speaker vector, wherein the correspondence is determined according to the speech generation model; and querying, according to the correspondence, the speaker vector corresponding to the speaker identity.

In an embodiment of the present disclosure, performing, by using the vector quantization module of the speech generation model, the quantization on the speech encoding vector to obtain the speech quantization sequence includes:

based on a codebook in the vector quantization module of the speech generation model, performing the quantization on the speech encoding vector through a nearest neighbor search algorithm to obtain the speech quantization sequence.

In an embodiment of the present disclosure, performing the quantization on the speech encoding vector through the nearest neighbor search algorithm to obtain the speech quantization sequence includes:

updating the codebook to obtain an updated codebook; and based on the updated codebook, performing the quantization on the speech encoding vector through the nearest neighbor search algorithm to obtain the speech quantization sequence.

In an embodiment of the present disclosure, updating the codebook to obtain the updated codebook includes:

acquiring a codebook identity of each frame of codebook, and comparing codebook identities to obtain a comparison result; and merging codebooks according to the comparison result to obtain the updated codebook.

In an embodiment of the present disclosure, inputting the to-be-processed feature vector into the sequence-to-sequence model to obtain the acoustic feature vector includes:

acquiring a to-be-processed acoustic vector of the to-be-processed feature vector, and inputting the to-be-processed feature vector and the to-be-processed acoustic vector into the sequence-to-sequence model to make the sequence-to-sequence model output a processed acoustic vector; and performing the loss calculation on the to-be-processed acoustic vector and the processed acoustic vector to obtain a second loss value, and determining the processed acoustic vector as the acoustic feature vector according to the second loss value.

In an embodiment of the present disclosure, inputting the to-be-processed feature vector and the to-be-processed acoustic vector into the sequence-to-sequence model to make the sequence-to-sequence model output the processed acoustic vector includes:

inputting the to-be-processed feature vector and the to-be-processed acoustic vector into the sequence-to-sequence model, and performing, by using an encoder module of the sequence-to-sequence model, nonlinear mapping on the to-be-processed feature vector and the to-be-processed acoustic vector to obtain a spatial encoding vector;

summing the spatial encoding vector and the speaker vector to obtain a to-be-aligned vector, and acquiring a speech feature sequence; and aligning, by using an attention mechanism of the sequence-to-sequence model, the to-be-aligned vector and the speech feature sequence to obtain a contextual representation vector, and performing, by using a decoder of the sequence-to-sequence model, the non-linear mapping on the contextual representation vector to obtain the processed acoustic vector.

In an embodiment of the present disclosure, determining the to-be-processed feature vector according to the text feature vector and the language unit vector includes:

determining the text feature vector or the language unit vector as the to-be-processed feature vector; or summing the text feature vector and the language unit vector to obtain the to-be-processed feature vector.

In an embodiment of the present disclosure, inputting the acoustic feature vector into the vocoder to obtain the target speech corresponding to the to-be-processed speech or the text feature vector includes:

extracting, by a post-processing network, a speech acoustic feature of the acoustic feature vector, and inputting the speech acoustic feature into the vocoder to make the vocoder output a pending speech corresponding to the to-be-processed speech or the text feature vector; and performing loss calculation on the pending speech and the to-be-processed speech to obtain a third loss value, and determining the pending speech as the target speech according to the third loss value.

In an embodiment of the present disclosure, performing the loss calculation on the pending speech and the to-be-processed speech to obtain the third loss value includes:

if the vocoder is a generative adversarial network, performing the loss calculation on the pending speech and the to-be-processed speech to obtain an adversarial network loss value of the generative adversarial network; and performing the loss calculation on the pending speech and the to-be-processed speech to obtain a speech feature loss value, and performing a weighted sum on the adversarial network loss value and the speech feature loss value to obtain the third loss value.

Specific details of the device for generating the speech have been described in detail in the corresponding method for generating the speech, which will not be repeated here.

It should be noted that although several modules or units of the device for generating the speech are mentioned in the above detailed description, such division of modules or units is not mandatory. In fact, features and functions of two or more of the modules or units described above may be embodied in one module or unit in accordance with embodiments of the present disclosure. Conversely, the features and functions of one module or unit described above may be further divided into a plurality of modules or units.

In addition, in embodiments of the present disclosure, there is further provided an electronic device capable of implementing the above method.

An electronic device 1400 according to such embodiment of the present disclosure is described below with reference to FIG. 14. The electronic device 1400 shown in FIG. 14 is only an example and should not bring any limitations to functions and a scope of use of embodiments of the present disclosure.

Figure 14:
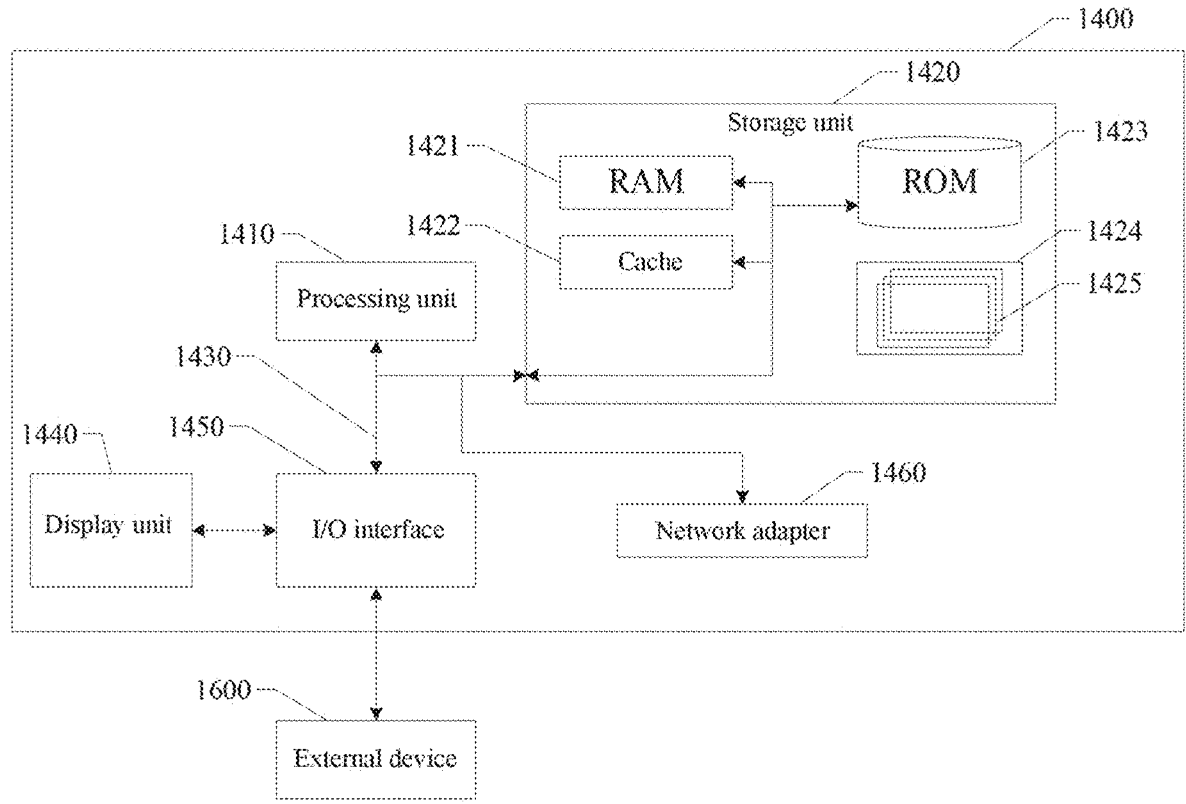
FIG. 14 schematically shows an electronic device for implementing a method for generating a speech in an embodiment of the present disclosure.

As shown in FIG. 14, the electronic device 1400 takes the form of a general-purpose computing device. Components of the electronic device 1400 may include, but are not limited to: at least one processing unit 1410, at least one storage unit 1420, a bus 1430 connecting different system components (including the storage unit 1420 and the processing unit 1410), and a display unit 1440.

The storage unit stores program codes, and the program codes may be executed by the processing unit 1410, so that the processing unit 1410 performs steps according to various embodiments of the present disclosure described in the above-mentioned "Example Method" section of this specification. For example, the method includes:

acquiring a speech feature vector of a to-be-processed speech, and inputting the speech feature vector into a speech generation model to obtain a language unit vector;

acquiring a text feature vector, and determining a to-be-processed feature vector according to the text feature vector and the language unit vector; and inputting the to-be-processed feature vector into a sequence-to-sequence model to obtain an acoustic feature vector, and inputting the acoustic feature vector into a vocoder to obtain a target speech corresponding to the to-be-processed speech or the text feature vector.

In an embodiment of the present disclosure, inputting the speech feature vector into the speech generation model to obtain the language unit vector includes:

inputting the speech feature vector into the speech generation model to make the speech generation model output a speech encoding vector and a self-restored speech; and performing loss calculation on the to-be-processed speech and the self-restored speech to obtain a first loss value, and determining the speech encoding vector as the language unit vector according to the first loss value.

In an embodiment of the present disclosure, inputting the speech feature vector into the speech generation model to make the speech generation model output the speech encoding vector and the self-restored speech includes:

inputting the speech feature vector into the speech generation model, and performing, by using an encoder module of the speech generation model, nonlinear transformation on the speech feature vector to obtain the speech encoding vector;

performing, by using a vector quantization module of the speech generation model, quantization on the speech encoding vector to obtain a speech quantization sequence, and acquiring a speaker vector corresponding to the to-be-processed speech; and performing, by using a decoder module of the speech generation model, the nonlinear transformation on the speech quantization sequence and the speaker vector to obtain the self-restored speech.

In an embodiment of the present disclosure, acquiring the speaker vector corresponding to the to-be-processed speech includes:

acquiring a speaker identity corresponding to the to-be-processed speech, and determining a correspondence between the speaker identity and the speaker vector, wherein the correspondence is determined according to the speech generation model; and querying, according to the correspondence, the speaker vector corresponding to the speaker identity.

In an embodiment of the present disclosure, performing, by using the vector quantization module of the speech generation model, the quantization on the speech encoding vector to obtain the speech quantization sequence includes:

based on a codebook in the vector quantization module of the speech generation model, performing the quantization on the speech encoding vector through a nearest neighbor search algorithm to obtain the speech quantization sequence.

In an embodiment of the present disclosure, performing the quantization on the speech encoding vector through the nearest neighbor search algorithm to obtain the speech quantization sequence includes:

updating the codebook to obtain an updated codebook; and based on the updated codebook, performing the quantization on the speech encoding vector through the nearest neighbor search algorithm to obtain the speech quantization sequence.

In an embodiment of the present disclosure, updating the codebook to obtain the updated codebook includes:

acquiring a codebook identity of each frame of codebook, and comparing codebook identities to obtain a comparison result; and merging codebooks according to the comparison result to obtain the updated codebook.

In an embodiment of the present disclosure, inputting the to-be-processed feature vector into the sequence-to-sequence model to obtain the acoustic feature vector includes:

acquiring a to-be-processed acoustic vector of the to-be-processed feature vector, and inputting the to-be-processed feature vector and the to-be-processed acoustic vector into the sequence-to-sequence model to make the sequence-to-sequence model output a processed acoustic vector; and performing the loss calculation on the to-be-processed acoustic vector and the processed acoustic vector to obtain a second loss value, and determining the processed acoustic vector as the acoustic feature vector according to the second loss value.

In an embodiment of the present disclosure, inputting the to-be-processed feature vector and the to-be-processed acoustic vector into the sequence-to-sequence model to make the sequence-to-sequence model output the processed acoustic vector includes:

inputting the to-be-processed feature vector and the to-be-processed acoustic vector into the sequence-to-sequence model, and performing, by using an encoder module of the sequence-to-sequence model, nonlinear mapping on the to-be-processed feature vector and the to-be-processed acoustic vector to obtain a spatial encoding vector;

summing the spatial encoding vector and the speaker vector to obtain a to-be-aligned vector, and acquiring a speech feature sequence; and aligning, by using an attention mechanism of the sequence-to-sequence model, the to-be-aligned vector and the speech feature sequence to obtain a contextual representation vector, and performing, by using a decoder of the sequence-to-sequence model, the nonlinear mapping on the contextual representation vector to obtain the processed acoustic vector.

In an embodiment of the present disclosure, determining the to-be-processed feature vector according to the text feature vector and the language unit vector includes:

determining the text feature vector or the language unit vector as the to-be-processed feature vector; or summing the text feature vector and the language unit vector to obtain the to-be-processed feature vector.

In an embodiment of the present disclosure, inputting the acoustic feature vector into the vocoder to obtain the target speech corresponding to the to-be-processed speech or the text feature vector includes:

extracting, by a post-processing network, a speech acoustic feature of the acoustic feature vector, and inputting the speech acoustic feature into the vocoder to make the vocoder output a pending speech corresponding to the to-be-processed speech or the text feature vector; and performing loss calculation on the pending speech and the to-be-processed speech to obtain a third loss value, and determining the pending speech as the target speech according to the third loss value.

In an embodiment of the present disclosure, performing the loss calculation on the pending speech and the to-be-processed speech to obtain the third loss value includes:

if the vocoder is a generative adversarial network, performing the loss calculation on the pending speech and the to-be-processed speech to obtain an adversarial network loss value of the generative adversarial network; and performing the loss calculation on the pending speech and the to-be-processed speech to obtain a speech feature loss value, and performing a weighted sum on the adversarial network loss value and the speech feature loss value to obtain the third loss value.

Through the above method, by acquiring the speech feature vector and the text feature vector, the speech and the text can be received as the inputs, which facilitate the fusion of a TTS task and a VC task to perform multimodal modeling, and improve the performance of the TTS task and the VC task. Furthermore, the speech feature vector and the text feature vector are acquired in the case of a small amount of data, which provides a variety of voice cloning strategies, improves the effect of voice cloning under the small amount of data, reduces the training difficulty and training duration of various models, and supports voice cloning methods in various application scenarios.

The storage unit 1420 may include a readable medium in the form of a volatile storage unit, such as a random access storage unit (RAM) 1421 and/or a cache storage unit 1422, and may further include a read-only storage unit (ROM) 1423.

The storage unit 1420 may further include a program/utility tool 1424 having a set (at least one) of program modules 1425. Such program modules 1425 include, but are not limited to, an operating system, one or more application programs, other program modules, and program data. Each or some combination of these examples may include an implementation of a network environment.

The bus 1430 may be one or more of several types of bus structures, including a memory unit bus or a memory unit controller, a peripheral bus, a graphics acceleration port, a processing unit, or a local area bus using any bus structure in a variety of bus structures.

The electronic device 1400 may also communicate with one or more external devices 1600 (such as a keyboard, a pointing device, a Bluetooth device, etc.), and may also communicate with one or more devices that enable a user to interact with the electronic device 1400, and/or may also communicate with any device (such as a router, a modem) that can enable the electronic device 1400 to interact with one or more other computing devices. Such communication may be performed through an input/output (I/O) interface 1450. Moreover, the electronic device 1400 may also communicate with one or more networks (such as a local area network (LAN), a wide area network (WAN), and/or a public network, such as the Internet) through the network adapter 1460. As shown in the figure, the network adapter 1460 communicates with other modules of the electronic device 1400 through the bus 1430. It should be understood that although not shown in the figure, other hardware and/or software modules may be used in conjunction with the electronic device 1400, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein may be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to embodiments of the present disclosure.

In an embodiment of the present disclosure, there is further provided a computer-readable storage medium having a program product stored thereon which is capable of implementing the method described above in this specification. In some embodiments of the present disclosure, various aspects of the present disclosure may also be implemented in the form of a program product, which includes program codes. When the program product is run on a terminal device, the program code is used to cause the terminal device to perform steps according to various embodiments of the present disclosure described in the above-mentioned "Example Method" section of this specification. For example, the method includes:

acquiring a speech feature vector of a to-be-processed speech, and inputting the speech feature vector into a speech generation model to obtain a language unit vector;

acquiring a text feature vector, and determining a to-be-processed feature vector according to the text feature vector and the language unit vector; and inputting the to-be-processed feature vector into a sequence-to-sequence model to obtain an acoustic feature vector, and inputting the acoustic feature vector into a vocoder to obtain a target speech corresponding to the to-be-processed speech or the text feature vector.

In an embodiment of the present disclosure, inputting the speech feature vector into the speech generation model to obtain the language unit vector includes:

inputting the speech feature vector into the speech generation model to make the speech generation model output a speech encoding vector and a self-restored speech; and performing loss calculation on the to-be-processed speech and the self-restored speech to obtain a first loss value, and determining the speech encoding vector as the language unit vector according to the first loss value.

In an embodiment of the present disclosure, inputting the speech feature vector into the speech generation model to make the speech generation model output the speech encoding vector and the self-restored speech includes:

inputting the speech feature vector into the speech generation model, and performing, by using an encoder module of the speech generation model, nonlinear transformation on the speech feature vector to obtain the speech encoding vector;

performing, by using a vector quantization module of the speech generation model, quantization on the speech encoding vector to obtain a speech quantization sequence, and acquiring a speaker vector corresponding to the to-be-processed speech; and performing, by using a decoder module of the speech generation model, the nonlinear transformation on the speech quantization sequence and the speaker vector to obtain the self-restored speech.

In an embodiment of the present disclosure, acquiring the speaker vector corresponding to the to-be-processed speech includes:

acquiring a speaker identity corresponding to the to-be-processed speech, and determining a correspondence between the speaker identity and the speaker vector, wherein the correspondence is determined according to the speech generation model; and querying, according to the correspondence, the speaker vector corresponding to the speaker identity.

In an embodiment of the present disclosure, performing, by using the vector quantization module of the speech generation model, the quantization on the speech encoding vector to obtain the speech quantization sequence includes:

based on a codebook in the vector quantization module of the speech generation model, performing the quantization on the speech encoding vector through a nearest neighbor search algorithm to obtain the speech quantization sequence.

In an embodiment of the present disclosure, performing the quantization on the speech encoding vector through the nearest neighbor search algorithm to obtain the speech quantization sequence includes:

updating the codebook to obtain an updated codebook; and based on the updated codebook, performing the quantization on the speech encoding vector through the nearest neighbor search algorithm to obtain the speech quantization sequence.

In an embodiment of the present disclosure, updating the codebook to obtain the updated codebook includes:

acquiring a codebook identity of each frame of codebook, and comparing codebook identities to obtain a comparison result; and merging codebooks according to the comparison result to obtain the updated codebook.

In an embodiment of the present disclosure, inputting the to-be-processed feature vector into the sequence-to-sequence model to obtain the acoustic feature vector includes:

acquiring a to-be-processed acoustic vector of the to-be-processed feature vector, and inputting the to-be-processed feature vector and the to-be-processed acoustic vector into the sequence-to-sequence model to make the sequence-to-sequence model output a processed acoustic vector; and performing the loss calculation on the to-be-processed acoustic vector and the processed acoustic vector to obtain a second loss value, and determining the processed acoustic vector as the acoustic feature vector according to the second loss value.

In an embodiment of the present disclosure, inputting the to-be-processed feature vector and the to-be-processed acoustic vector into the sequence-to-sequence model to make the sequence-to-sequence model output the processed acoustic vector includes:

inputting the to-be-processed feature vector and the to-be-processed acoustic vector into the sequence-to-sequence model, and performing, by using an encoder module of the sequence-to-sequence model, nonlinear mapping on the to-be-processed feature vector and the to-be-processed acoustic vector to obtain a spatial encoding vector;

summing the spatial encoding vector and the speaker vector to obtain a to-be-aligned vector, and acquiring a speech feature sequence; and aligning, by using an attention mechanism of the sequence-to-sequence model, the to-be-aligned vector and the speech feature sequence to obtain a contextual representation vector, and performing, by using a decoder of the sequence-to-sequence model, the nonlinear mapping on the contextual representation vector to obtain the processed acoustic vector.

In an embodiment of the present disclosure, determining the to-be-processed feature vector according to the text feature vector and the language unit vector includes:

determining the text feature vector or the language unit vector as the to-be-processed feature vector; or summing the text feature vector and the language unit vector to obtain the to-be-processed feature vector.

In an embodiment of the present disclosure, inputting the acoustic feature vector into the vocoder to obtain the target speech corresponding to the to-be-processed speech or the text feature vector includes:

extracting, by a post-processing network, a speech acoustic feature of the acoustic feature vector, and inputting the speech acoustic feature into the vocoder to make the vocoder output a pending speech corresponding to the to-be-processed speech or the text feature vector; and performing loss calculation on the pending speech and the to-be-processed speech to obtain a third loss value, and determining the pending speech as the target speech according to the third loss value.

In an embodiment of the present disclosure, performing the loss calculation on the pending speech and the to-be-processed speech to obtain the third loss value includes:

if the vocoder is a generative adversarial network, performing the loss calculation on the pending speech and the to-be-processed speech to obtain an adversarial network loss value of the generative adversarial network; and performing the loss calculation on the pending speech and the to-be-processed speech to obtain a speech feature loss value, and performing a weighted sum on the adversarial network loss value and the speech feature loss value to obtain the third loss value.

Through the above method, by acquiring the speech feature vector and the text feature vector, the speech and the text can be received as the inputs, which facilitate the fusion of a TTS task and a VC task to perform multimodal modeling, and improve the performance of the TTS task and the VC task. Furthermore, the speech feature vector and the text feature vector are acquired in the case of a small amount of data, which provides a variety of voice cloning strategies, improves the effect of voice cloning under the small amount of data, reduces the training difficulty and training duration of various models, and supports voice cloning methods in various application scenarios.

Figure 15:
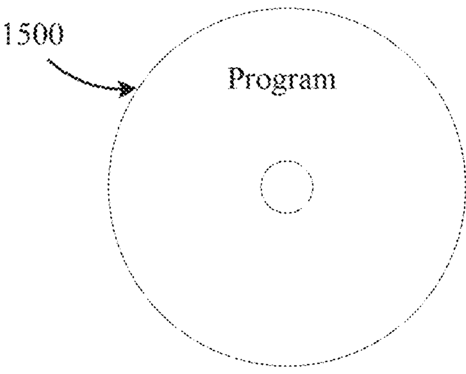
FIG. 15 schematically shows a computer-readable storage medium for implementing a method for generating a speech in an embodiment of the present disclosure.

Referring to FIG. 15, a program product 1500 for implementing the above-mentioned method according to an embodiment of the present disclosure is described. The program product 1500 may take the form of a portable Compact Disc Read-Only Memory (CD-ROM) and include program codes, and may be run on a terminal device, such as a personal computer. However, the program product of the present disclosure is not limited thereto. The readable storage medium herein may be any tangible medium containing or storing a program, and the program may be used by an instruction execution system, an apparatus, or a device, or the program may be used in combination with the instruction execution system, the apparatus, or the device.

The program product may be any combination of one or more readable mediums. The readable medium may be a readable signal medium or a readable storage medium. The readable storage medium may be, for example, but is not limited to, electronic, magnetic, optical, electromagnetic, infrared, or a semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing.

The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure may be written in any combination of one or more programming languages, which include object-oriented programming languages, such as Java, C++, and so on. The programming languages also include conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A method for generating a speech, performed by terminal device, comprising:

acquiring a speech feature vector of a to-be-processed speech, and inputting the speech feature vector into a speech generation model to obtain a language unit vector;

acquiring a text feature vector, and determining a to-be-processed feature vector according to the text feature vector and the language unit vector; and inputting the to-be-processed feature vector into a sequence-to-sequence model to obtain an acoustic feature vector, and inputting the acoustic feature vector into a vocoder to obtain a target speech corresponding to the to-be-processed speech or the text feature vector.

2. The method for generating the speech according to claim 1, wherein inputting the speech feature vector into the speech generation model to obtain the language unit vector comprises:

inputting the speech feature vector into the speech generation model to make the speech generation model output a speech encoding vector and a self-restored speech; and performing loss calculation on the to-be-processed speech and the self-restored speech to obtain a first loss value, and determining the speech encoding vector as the language unit vector according to the first loss value.

3. The method for generating the speech according to claim 2, wherein inputting the speech feature vector into the speech generation model to make the speech generation model output the speech encoding vector and the self-restored speech comprises:

inputting the speech feature vector into the speech generation model, and performing, by using an encoder module of the speech generation model, nonlinear transformation on the speech feature vector to obtain the speech encoding vector;

performing, by using a vector quantization module of the speech generation model, quantization on the speech encoding vector to obtain a speech quantization sequence, and acquiring a speaker vector corresponding to the to-be-processed speech; and performing, by using a decoder module of the speech generation model, the nonlinear transformation on the speech quantization sequence and the speaker vector to obtain the self-restored speech.

4. The method for generating the speech according to claim 3, wherein acquiring the speaker vector corresponding to the to-be-processed speech comprises:

acquiring a speaker identity corresponding to the to-be-processed speech, and determining a correspondence between the speaker identity and the speaker vector, wherein the correspondence is determined according to the speech generation model; and querying, according to the correspondence, the speaker vector corresponding to the speaker identity.

5. The method for generating the speech according to claim 3, wherein performing, by using the vector quantization module of the speech generation model, the quantization on the speech encoding vector to obtain the speech quantization sequence comprises:

based on a codebook in the vector quantization module of the speech generation model, performing the quantization on the speech encoding vector through a nearest neighbor search algorithm to obtain the speech quantization sequence.

6. The method for generating the speech according to claim 5, wherein performing the quantization on the speech encoding vector through the nearest neighbor search algorithm to obtain the speech quantization sequence comprises:

updating the codebook to obtain an updated codebook; and based on the updated codebook, performing the quantization on the speech encoding vector through the nearest neighbor search algorithm to obtain the speech quantization sequence.

7. The method for generating the speech according to claim 6, wherein updating the codebook to obtain the updated codebook comprises:

acquiring a codebook identity of each frame of codebook, and comparing codebook identities to obtain a comparison result; and merging codebooks according to the comparison result to obtain the updated codebook.

8. The method for generating the speech according to claim 3, wherein inputting the to-be-processed feature vector into the sequence-to-sequence model to obtain the acoustic feature vector comprises:

acquiring a to-be-processed acoustic vector of the to-be-processed feature vector, and inputting the to-be-processed feature vector and the to-be-processed acoustic vector into the sequence-to-sequence model to make the sequence-to-sequence model output a processed acoustic vector; and performing the loss calculation on the to-be-processed acoustic vector and the processed acoustic vector to obtain a second loss value, and determining the processed acoustic vector as the acoustic feature vector according to the second loss value.

9. The method for generating the speech according to claim 8, wherein inputting the to-be-processed feature vector and the to-be-processed acoustic vector into the sequence-to-sequence model to make the sequence-to-sequence model output the processed acoustic vector comprises:

inputting the to-be-processed feature vector and the to-be-processed acoustic vector into the sequence-to-sequence model, and performing, by using an encoder module of the sequence-to-sequence model, nonlinear mapping on the to-be-processed feature vector and the to-be-processed acoustic vector to obtain a spatial encoding vector;

summing the spatial encoding vector and the speaker vector to obtain a to-be-aligned vector, and acquiring a speech feature sequence; and aligning, by using an attention mechanism of the sequence-to-sequence model, the to-be-aligned vector and the speech feature sequence to obtain a contextual representation vector, and performing, by using a decoder of the sequence-to-sequence model, the nonlinear mapping on the contextual representation vector to obtain the processed acoustic vector.

10. The method for generating the speech according to claim 1, wherein determining the to-be-processed feature vector according to the text feature vector and the language unit vector comprises:

determining the text feature vector or the language unit vector as the to-be-processed feature vector; or summing the text feature vector and the language unit vector to obtain the to-be-processed feature vector.

11. The method for generating the speech according to claim 1, wherein inputting the acoustic feature vector into the vocoder to obtain the target speech corresponding to the to-be-processed speech or the text feature vector comprises:

extracting, by a post-processing network, a speech acoustic feature of the acoustic feature vector, and inputting the speech acoustic feature into the vocoder to make the vocoder output a pending speech corresponding to the to-be-processed speech or the text feature vector; and performing loss calculation on the pending speech and the to-be-processed speech to obtain a third loss value, and determining the pending speech as the target speech according to the third loss value.

12. The method for generating the speech according to claim 11, wherein performing the loss calculation on the pending speech and the to-be-processed speech to obtain the third loss value comprises:

if the vocoder is a generative adversarial network, performing the loss calculation on the pending speech and the to-be-processed speech to obtain an adversarial network loss value of the generative adversarial network; and performing the loss calculation on the pending speech and the to-be-processed speech to obtain a speech feature loss value, and performing a weighted sum on the adversarial network loss value and the speech feature loss value to obtain the third loss value.

13. The method for generating the speech according to claim 1, wherein the speech feature vector of the to-be-processed speech is a Mel-spectrum feature vector.

14. The method for generating the speech according to claim 1, wherein the speech generation model is a Vector Quantization-Variational AutoEncoder (VQ-VAE) model.

15. The method for generating the speech according to claim 1, wherein acquiring the text feature vector comprise:

acquiring a natural text; and extracting a phoneme sequence of the natural text as the text feature vector.

16. The method for generating the speech according to claim 9, wherein aligning, by using the attention mechanism of the sequence-to-sequence model, the to-be-aligned vector and the speech feature sequence to obtain the contextual representation vector comprises:

performing a dot product calculation on the to-be-aligned vector and the speech feature sequence to obtain the contextual representation vector.

17. The method for generating the speech according to claim 12, wherein performing the weighted sum on the adversarial network loss value and the speech feature loss value to obtain the third loss value comprises:

setting corresponding weights for the adversarial network loss value and the speech feature loss value according to empirical values; and performing the weighted sum on the adversarial network loss value and the speech feature loss value to obtain the third loss value.

18. The method for generating the speech according to claim 1, wherein the vocoder is one of a Wavenet model, a Griffin-Lim algorithm, a Generative Adversarial Network (GAN).

19. A non-transitory computer-readable storage medium having a computer program stored thereon, wherein the computer program, when executed by a processor, implements the following operations:

acquiring a speech feature vector of a to-be-processed speech, and inputting the speech feature vector into a speech generation model to obtain a language unit vector:

acquiring a text feature vector, and determining a to-be-processed feature vector according to the text feature vector and the language unit vector; and inputting the to-be-processed feature vector into a sequence-to-sequence model to obtain an acoustic feature vector, and inputting the acoustic feature vector into a vocoder to obtain a target speech corresponding to the to-be-processed speech or the text feature vector.

20. An electronic device, comprising:

a processor; and a memory configured to store executable instructions of the processor;

wherein the processor is configured to execute the following operations via executing the executable instructions:

acquiring a speech feature vector of a to-be-processed speech, and inputting the speech feature vector into a speech generation model to obtain a language unit vector;

acquiring a text feature vector, and determining a to-be-processed feature vector according to the text feature vector and the language unit vector; and inputting the to-be-processed feature vector into a sequence-to-sequence model to obtain an acoustic feature vector, and inputting the acoustic feature vector into a vocoder to obtain a target speech corresponding to the to-be-processed speech or the text feature vector.

* * * * *